(12) United States Patent
Monro et al.

(10) Patent No.: US 11,843,593 B2
(45) Date of Patent: Dec. 12, 2023

(54) APPLICATION INTEGRATION USING MULTIPLE USER IDENTITIES

(71) Applicant: Citrix Systems, Inc., Ft. Lauderdale, FL (US)

(72) Inventors: Robert Monro, Girton (GB); Feng Huang, Girton (GB); Aleksis Sideris, Sofia (BG); Nikolay Paskulov, Sofia (BG); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 394 days.

(21) Appl. No.: 17/113,874

(22) Filed: Dec. 7, 2020

(65) Prior Publication Data

US 2021/0377252 A1 Dec. 2, 2021

Related U.S. Application Data

(60) Provisional application No. 63/078,371, filed on Sep. 15, 2020, provisional application No. 63/033,051, filed on Jun. 1, 2020.

(51) Int. Cl.
*H04L 29/06* (2006.01)
*H04L 9/40* (2022.01)

(52) U.S. Cl.
CPC ...... *H04L 63/0807* (2013.01); *H04L 63/0815* (2013.01); *H04L 63/0884* (2013.01); *H04L 63/102* (2013.01)

(58) Field of Classification Search
CPC ....... H04L 63/08–0815; H04L 63/0884; H04L 63/0102; H04L 63/0807; H04L 63/102; G06F 21/335
See application file for complete search history.

(56) References Cited

U.S. PATENT DOCUMENTS 7,240,214 B2 7/2007 Gazzetta et al.
7,965,707 B2 6/2011 Jones et al.
(Continued)

OTHER PUBLICATIONS

Feller, "Workspace Identity", Citrix Product Documentation, retrieved from https://docs.citrix.com/en-us/tech-zone/learn/tech-briefs/workspace-identity.html (Jul. 28, 2020).
(Continued)

*Primary Examiner* — Evans Desrosiers

(57) ABSTRACT

A method of providing access to digital resources using multiple user identities comprises receiving, from a client application, a first set of authentication tokens that authorize a user to acquire target data provided by a server application. The method further comprises receiving, from the client application, a second set of authentication tokens that authorize the same user to access a connected application. The method further comprises sending, to the server application, a first request to acquire the target data provided by the server application, the first request including the first set of authentication tokens and an identifier of the target data. The method further comprises receiving, from the server application, the target data. The method further comprises sending the target data from the application connector to the connected application in a second request that also includes the second set of authentication tokens.

20 Claims, 12 Drawing Sheets

(56) References Cited

U.S. PATENT DOCUMENTS

| | | |
|---|---|---|
| 8,060,560 B2 | 11/2011 | Vonog et al. |
| 8,190,556 B2 | 5/2012 | Pappas |
| 8,306,986 B2 | 11/2012 | Routson et al. |
| 8,429,204 B2 | 4/2013 | Qian et al. |
| 8,738,764 B1 | 5/2014 | Schepis et al. |
| 8,744,995 B1 | 6/2014 | Hewinson |
| 8,959,141 B2 | 2/2015 | Vonog et al. |
| 9,058,380 B2 | 6/2015 | Lesiecki et al. |
| 9,069,979 B2 | 6/2015 | Srinivasan et al. |
| 9,104,858 B1 | 8/2015 | Sundaram et al. |
| 9,424,554 B2 | 8/2016 | Hayton et al. |
| 9,471,331 B2 | 10/2016 | Kludy et al. |
| 9,774,586 B1 | 9/2017 | Roche et al. |
| 9,906,461 B2 | 2/2018 | Kludy et al. |
| 9,985,953 B2 * | 5/2018 | Koushik .................. G06F 8/60 |
| 10,877,960 B2 | 12/2020 | Feijoo |
| 2007/0192122 A1 | 8/2007 | Routson et al. |
| 2009/0210435 A1 | 8/2009 | Akiyama et al. |
| 2013/0318593 A1 | 11/2013 | Smith et al. |
| 2014/0046777 A1 | 2/2014 | Markey et al. |
| 2014/0075501 A1 | 3/2014 | Srinivasan et al. |
| 2014/0143211 A1 | 5/2014 | Baker et al. |
| 2014/0279201 A1 | 9/2014 | Iyoob et al. |
| 2014/0280261 A1 | 9/2014 | Butler et al. |
| 2015/0074758 A1 | 3/2015 | Zhou et al. |
| 2015/0188927 A1 | 7/2015 | Santhi et al. |
| 2015/0242520 A1 | 8/2015 | Li et al. |
| 2016/0019636 A1 | 1/2016 | Adapalli et al. |
| 2016/0048538 A1 | 2/2016 | Zhang |
| 2016/0048698 A1 | 2/2016 | Sahu et al. |
| 2016/0112872 A1 | 4/2016 | McClement et al. |
| 2016/0125405 A1 | 5/2016 | Alterman et al. |
| 2016/0134616 A1 | 5/2016 | Koushik et al. |
| 2017/0076286 A1 | 3/2017 | Castinado et al. |
| 2017/0264640 A1 | 9/2017 | Narayanaswamy et al. |
| 2017/0289107 A1 * | 10/2017 | Plichta .................. H04L 63/308 |
| 2017/0324652 A1 * | 11/2017 | Lee ...................... H04L 47/2458 |
| 2018/0159856 A1 | 6/2018 | Gujarathi |
| 2019/0058706 A1 | 2/2019 | Feijoo et al. |
| 2019/0114340 A1 | 4/2019 | Feijoo |

OTHER PUBLICATIONS

International Search Report and Written Opinion dated Aug. 12, 2021 for International Patent Application PCT/US2021/035051, 13 pages.

* cited by examiner

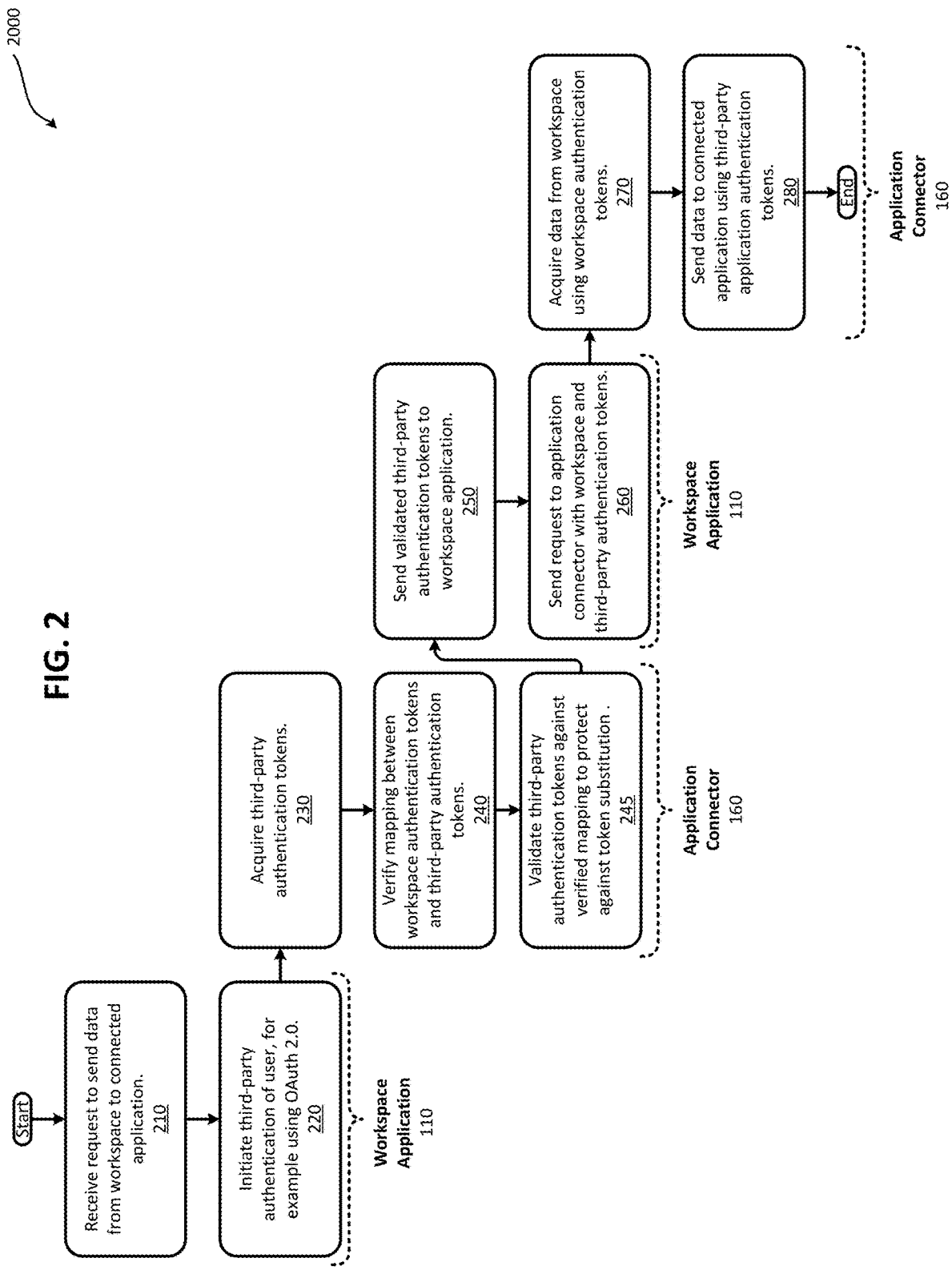

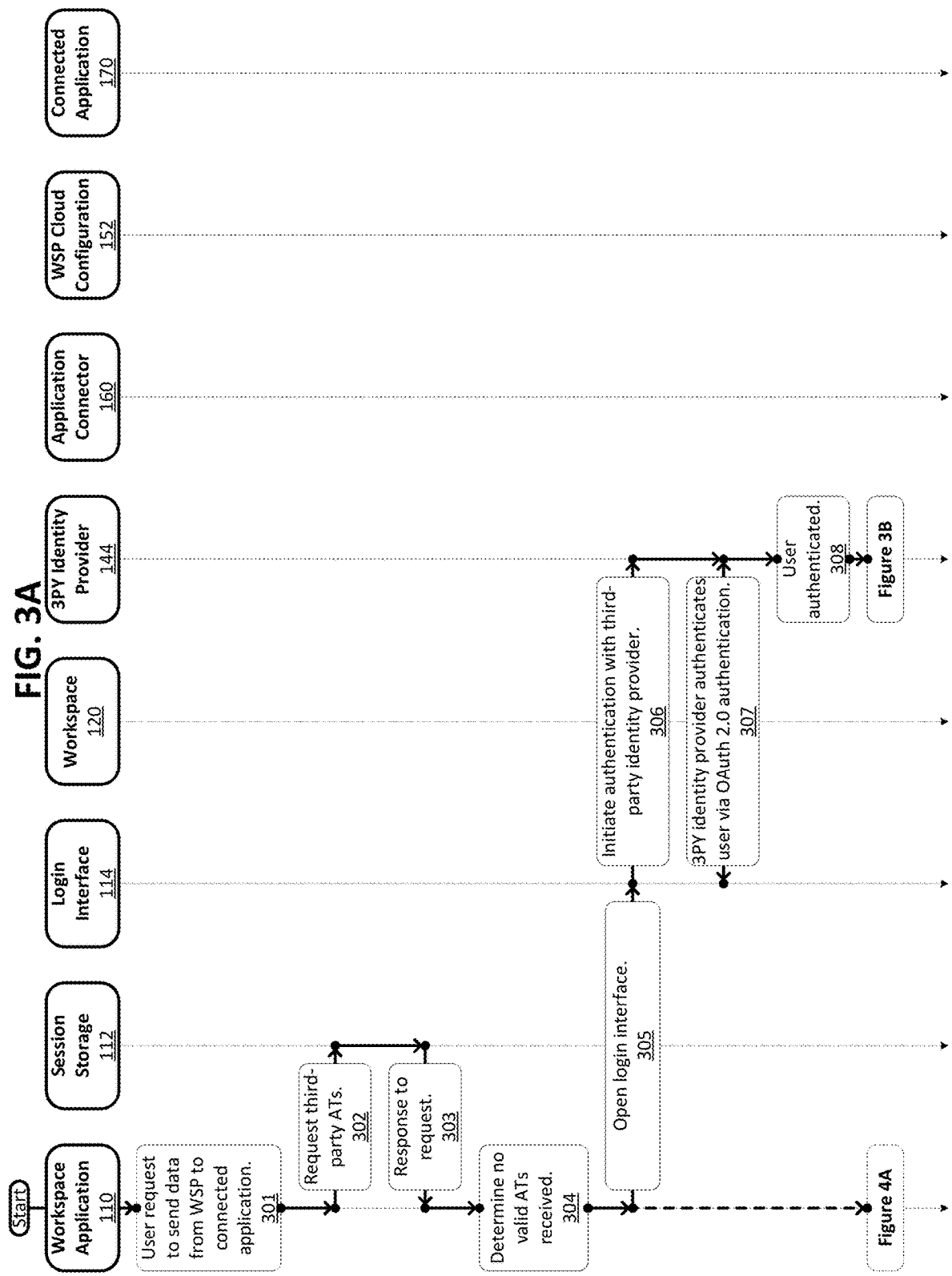

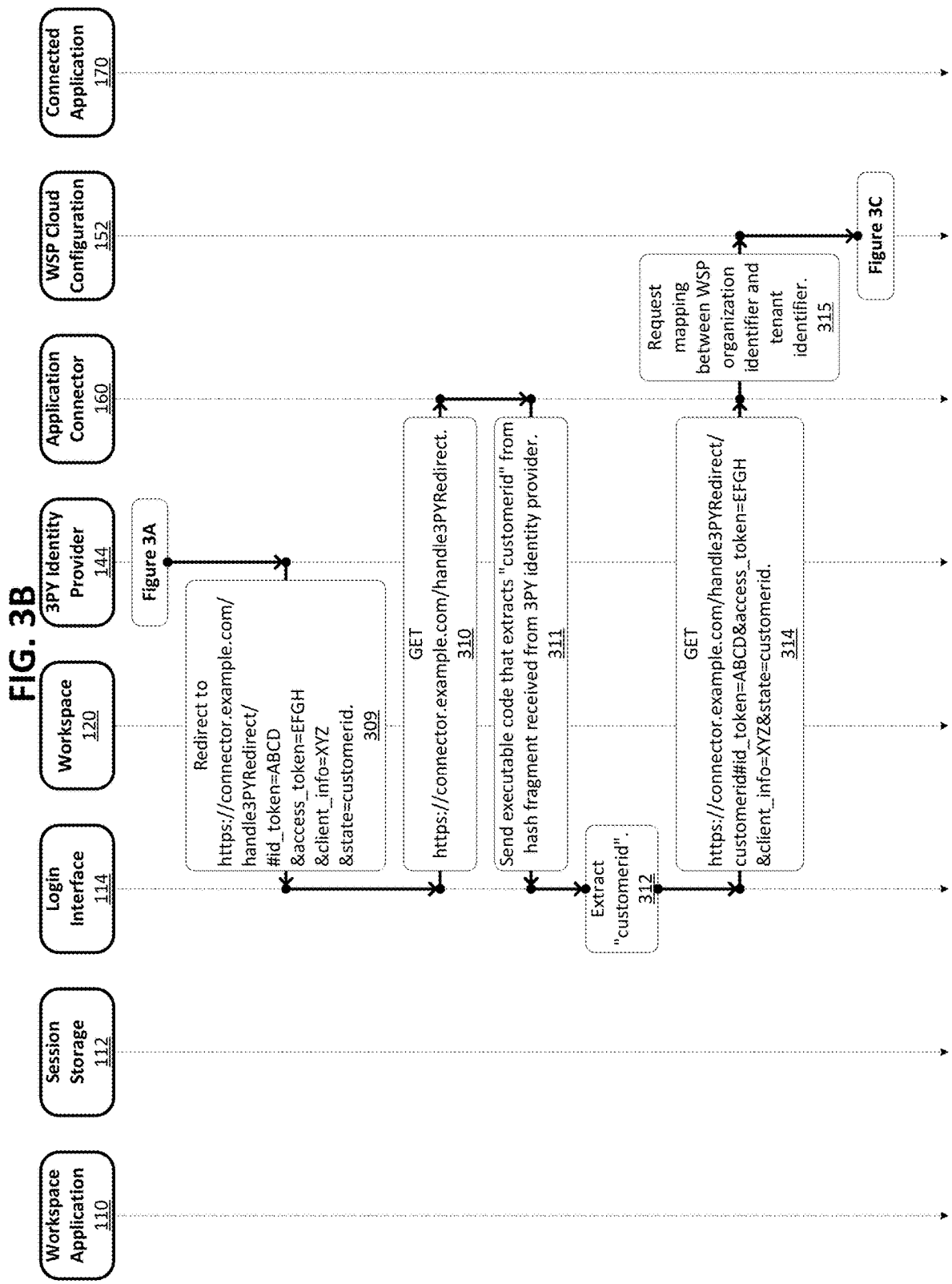

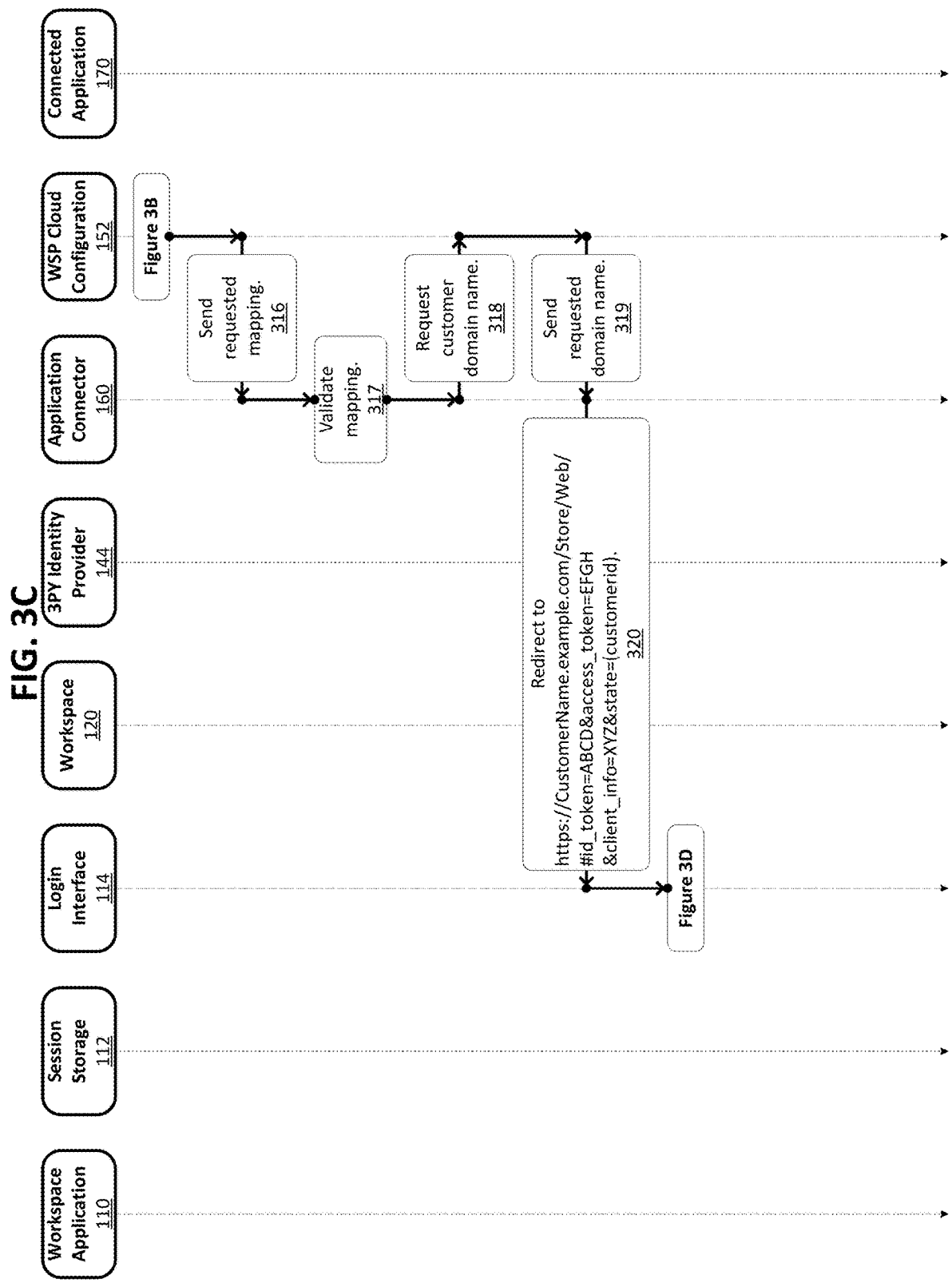

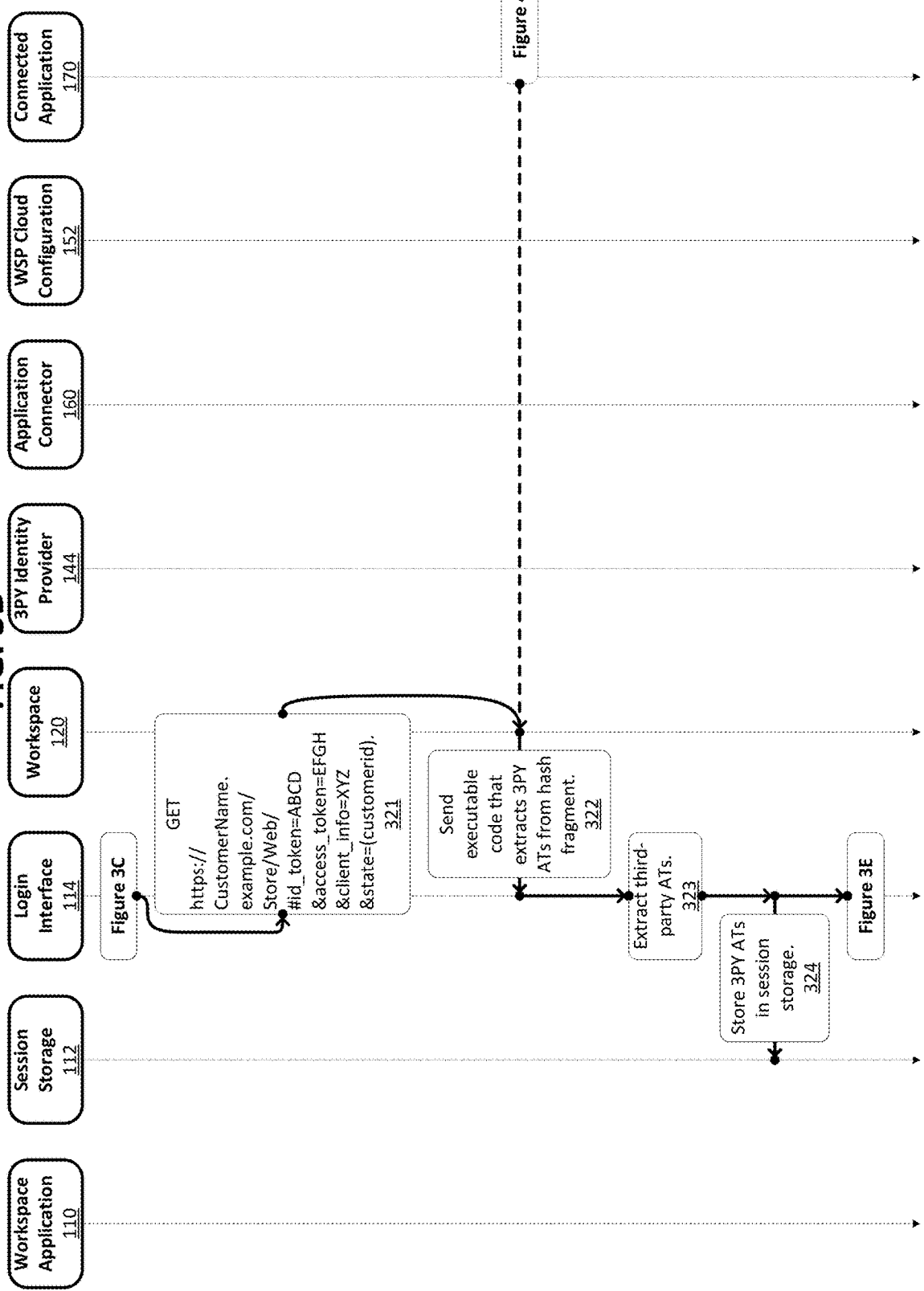

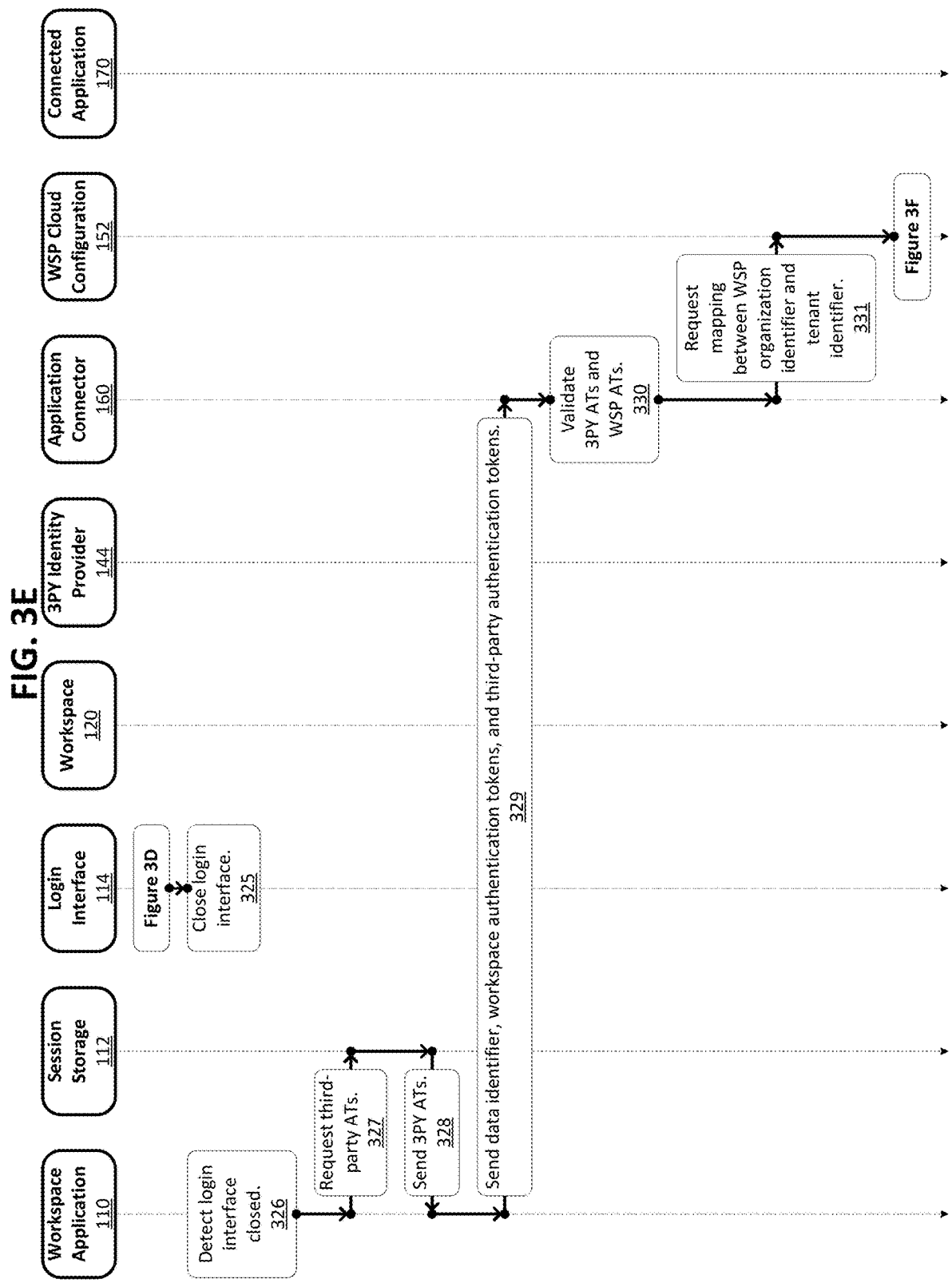

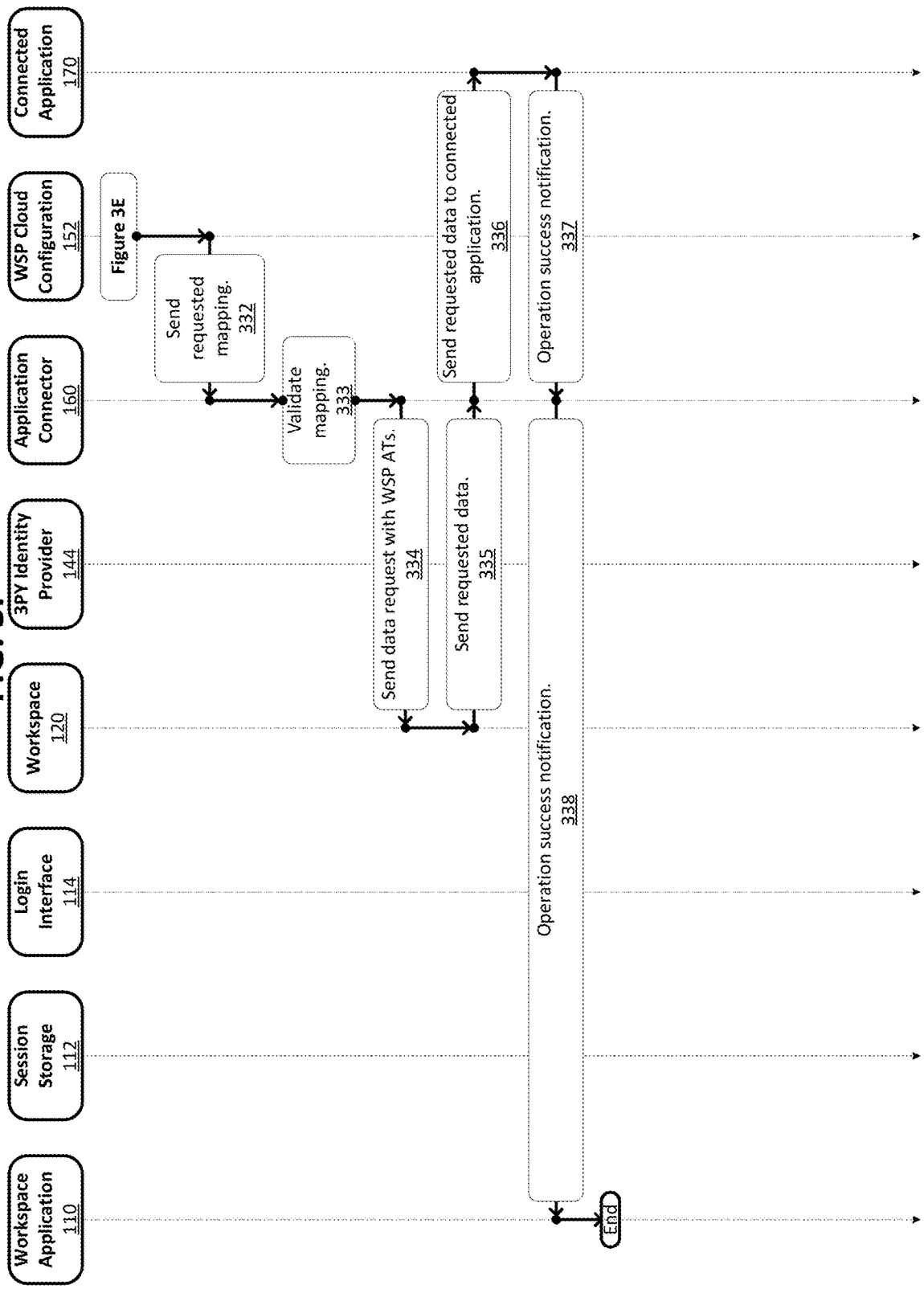

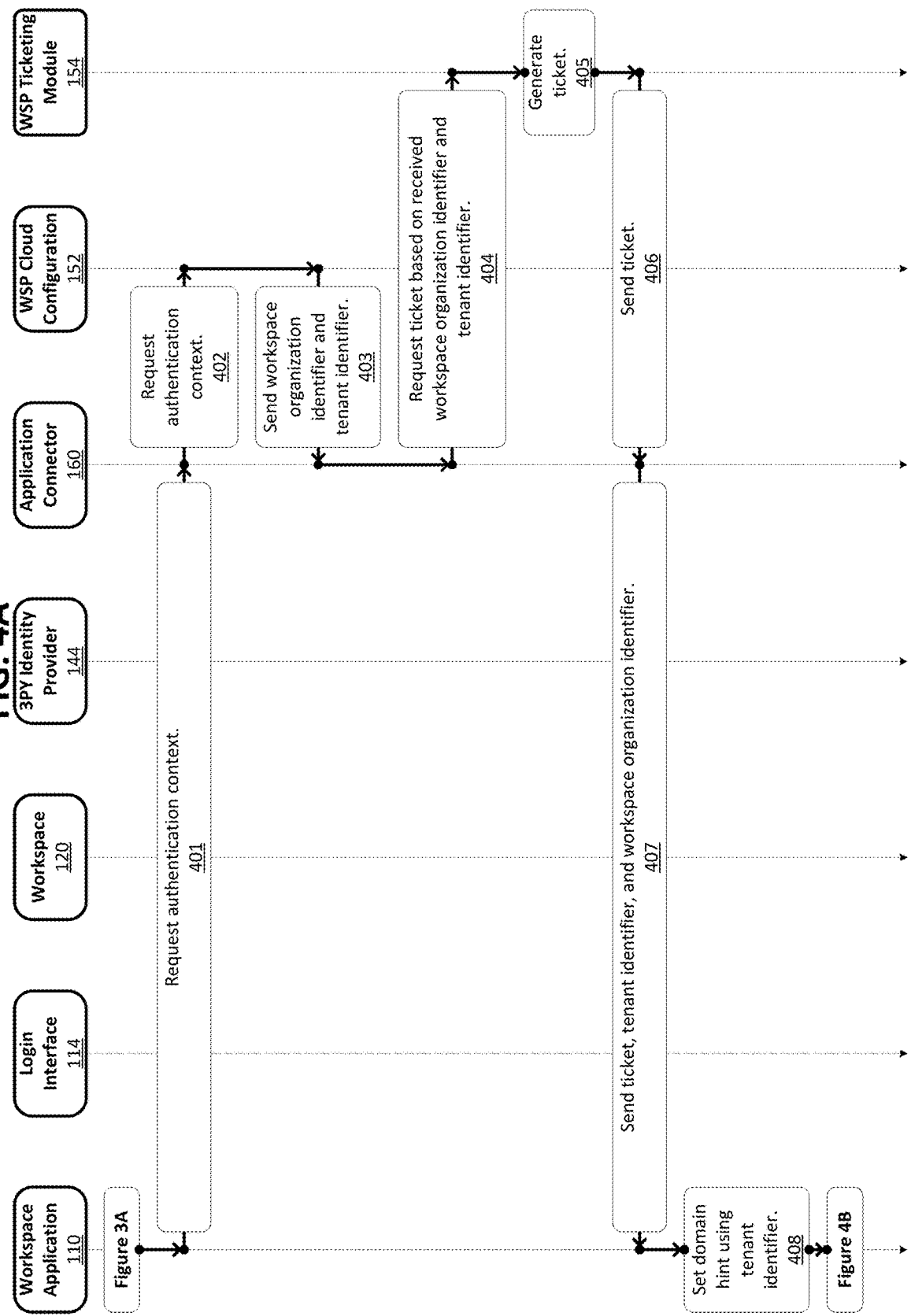

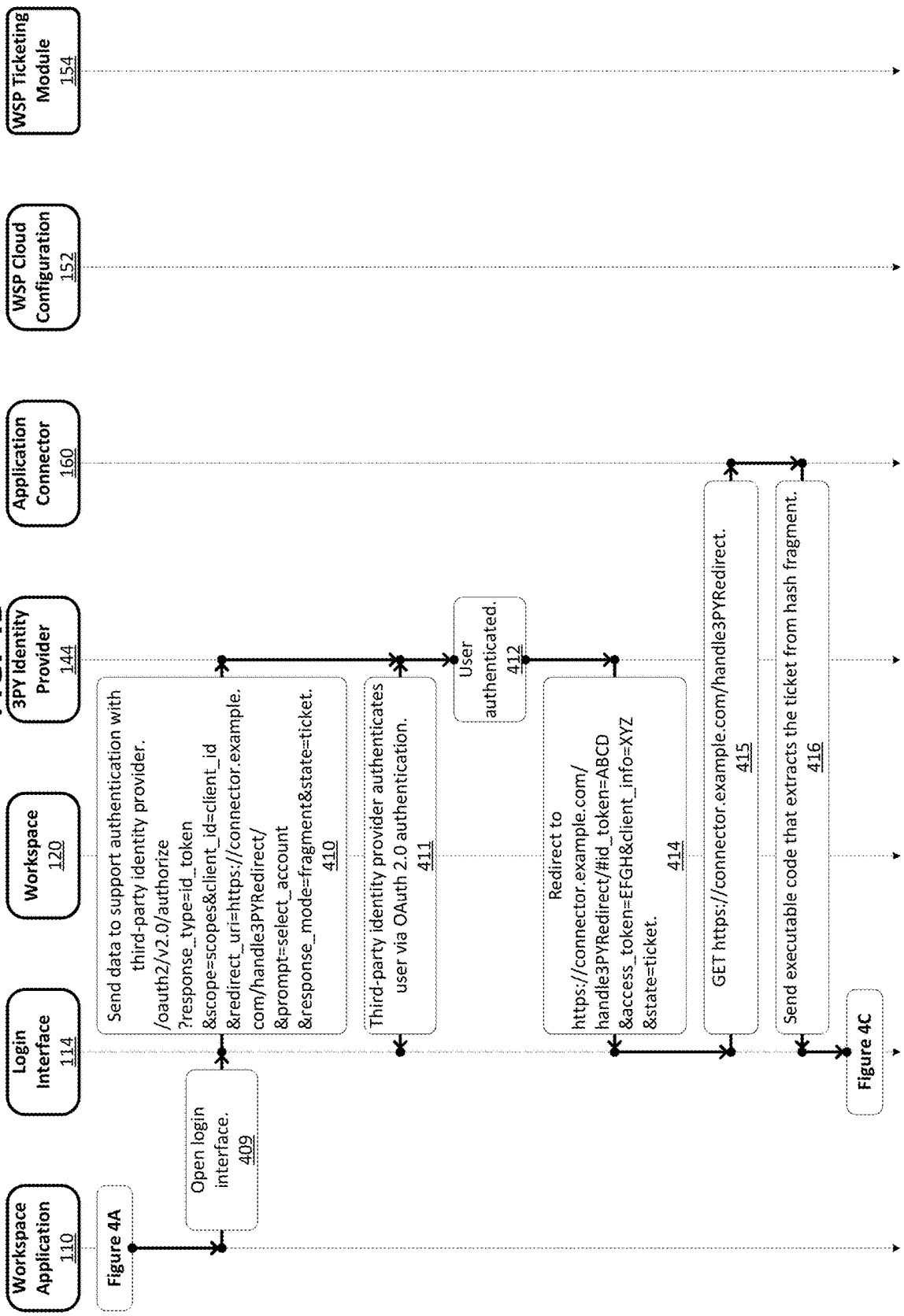

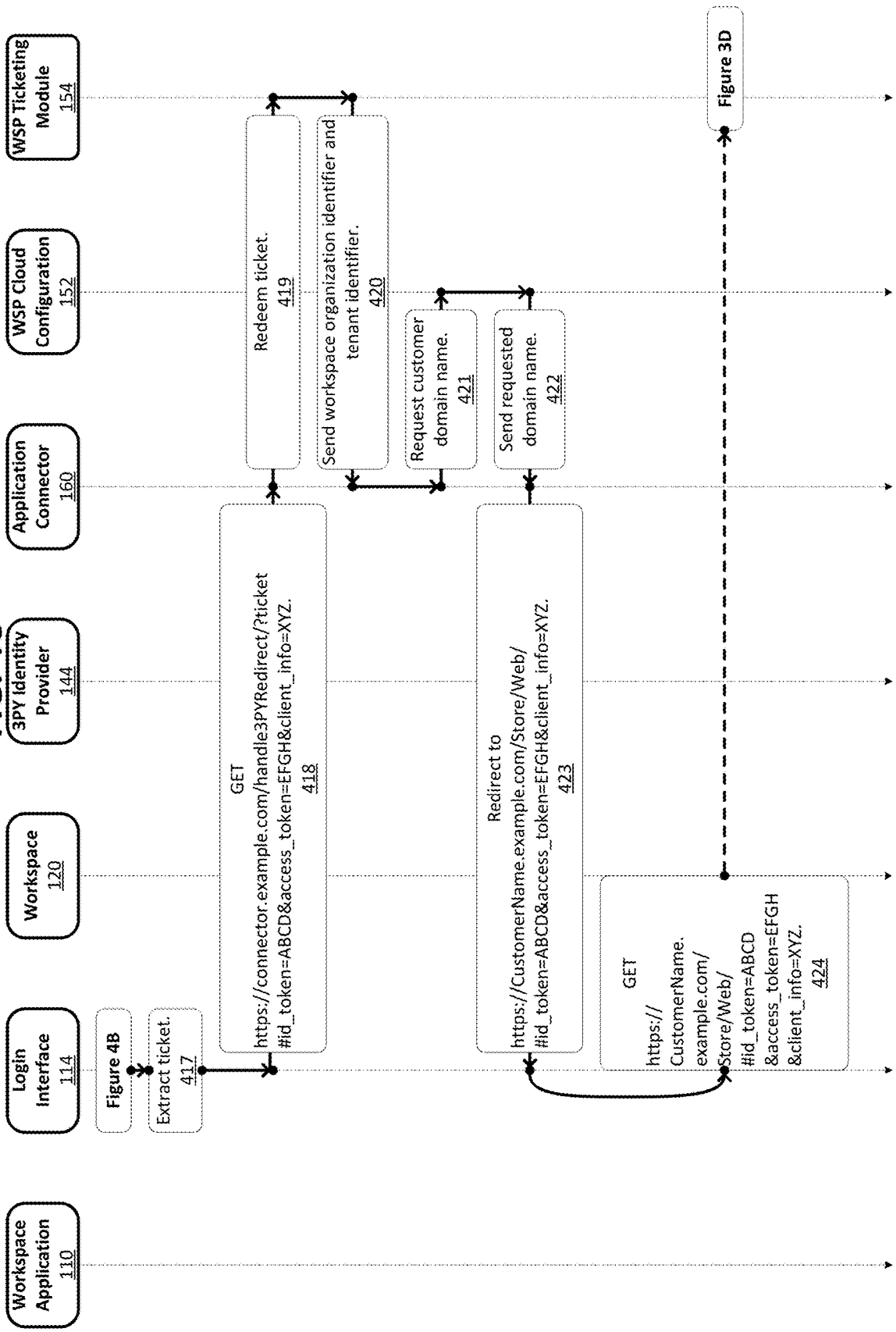

APPLICATION INTEGRATION USING MULTIPLE USER IDENTITIES

CROSS-REFERENCE TO RELATED APPLICATIONS

This application claims the benefit of U.S. Provisional Patent Application 63/033,051 (filed 1 Jun. 2020) and U.S. Provisional Patent Application 63/078,371 (filed 15 Sep. 2020). The entire disclosure of both of these priority applications is hereby incorporated herein by reference.

BACKGROUND

Authentication systems identify an entity. Authorization systems determine rights granted to an entity. In combination, authentication and authorization systems enable efficient and secure management of resources such as physical space, equipment, materials, and logical resources. Logical resources include data storage, software application access, digital services, and user data. Authentication and authorization systems allow individuals to be identified and provided with access to the resources needed to perform their assigned roles and tasks, thereby helping an organization to achieve its goals efficiently and securely.

In the context of logical resource management, an "identity provider" is an entity that creates, maintains, and manages identity information for individual users. Applications, services, and other digital resource providers often outsource their user authentication requirements to a trusted identity provider. Relying on a trusted identity provider for user authentication offers a number of advantages, such as facilitating single sign-on access to multiple resources, enhancing user experience by mitigating password fatigue, and decreasing potential attack surface. A wide range of identity providers have been developed, examples of which include Azure® Active Directory® (provided by Microsoft Corporation (Redmond, WA)), Okta® (provided by Okta, Inc. (San Francisco, CA)), and Citrix Gateway™ (provided by Citrix Systems, Inc. (Fort Lauderdale, FL)).

SUMMARY

In a first example implementation, a method of providing access to digital resources using multiple user identities comprises receiving, by an application connector, from a client application, a first set of authentication tokens that authorize a user of the client application to acquire target data provided by a server application. The method further comprises receiving, by the application connector, from the client application, a second set of authentication tokens that authorize the same user to access a connected application. The method further comprises sending, from the application connector, to the server application, a first request to acquire the target data provided by the server application, the first request including the first set of authentication tokens and an identifier of the target data. The method further comprises receiving, by the application connector, from the server application, the target data. The method further comprises sending the target data from the application connector to the connected application in a second request that also includes the second set of authentication tokens.

In a second example implementation, the user is a member of an organization; the first set of authentication tokens includes a customer identifier that uniquely identifies the organization to the server application; and the second set of authentication tokens includes a tenant identifier that uniquely identifies the organization to the connected application.

In a third example implementation, the first and second sets of authentication tokens are received in a single communication sent from the client application to the application connector.

In a fourth example implementation, the first and second sets of authentication tokens, as well as the identifier of the target data, are received in a single communication sent from the client application to the application connector.

In a fifth example implementation, the method further comprises, before the application connector receives the first and second sets of authentication tokens: receiving, by the application connector, from the client application, an HTTP GET request for a URI path that includes (a) a domain associated with the server application and (b) a ticket that is correlated to a customer identifier that uniquely identifies an organization to the server application, wherein the user is a member of the organization; generating a modified URI path that (a) includes a new domain associated with the organization and (b) excludes the ticket; and sending, from the application connector, to the client application, a redirect to the modified URI path.

In a sixth example implementation, the first set of authentication tokens is issued by a first identity provider that the server application recognizes as having authority to authenticate the user; and the second set of authentication tokens is issued by a second identity provider that the connected application recognizes as having authority to authenticate the user.

In a seventh example implementation, the user is a member of an organization; the first set of authentication tokens includes a customer identifier that uniquely identifies the organization to the server application; the second set of authentication tokens includes a tenant identifier that uniquely identifies the organization to the connected application; the method further comprises validating a mapping between the customer identifier and the tenant identifier; and the application connector receives the mapping from a configuration application.

In an eighth example implementation, a computer system comprises a memory, a network interface, and at least one processor coupled to the memory and the network interface. The processor is configured to receive, from a client application, a first set of authentication tokens that authorize a user of the client application to acquire target data provided by a server application. The processor is further configured to receive, from the client application, a second set of authentication tokens that authorize the same user to access a connected application. The processor is further configured to send, to the server application, a first request to acquire the target data provided by the server application, the first request including the first set of authentication tokens and an identifier of the target data. The processor is further configured to receive, from the server application, the target data. The processor is further configured to send the target data to the connected application in a second request that also includes the second set of authentication tokens.

In a ninth example implementation, the user is a member of an organization; the first set of authentication tokens includes a customer identifier that uniquely identifies the organization to the server application; and the second set of authentication tokens includes a tenant identifier that uniquely identifies the organization to the connected application.

In a tenth example implementation, the first and second sets of authentication tokens are received in a single communication sent from the client application.

In an eleventh example implementation, the first and second sets of authentication tokens, as well as the identifier of the target data, are received in a single communication sent from the client application.

In a twelfth example implementation, the at least one processor is further configured to, before receiving the first and second sets of authentication tokens: receive, from the client application, an HTTP GET request for a URI path that includes (a) a domain associated with the server application and (b) a ticket that is correlated to a customer identifier that uniquely identifies an organization to the server application, wherein the user is a member of the organization; generate a modified URI path that (a) includes a new domain associated with the organization and (b) excludes the ticket; and send, to the client application, a redirect to the modified URI path.

In a thirteenth example implementation, the first set of authentication tokens is issued by a first identity provider that the server application recognizes as having authority to authenticate the user; and the second set of authentication tokens is issued by a second identity provider that the connected application recognizes as having authority to authenticate the user.

In a fourteenth example implementation, the user is a member of an organization; the first set of authentication tokens includes a customer identifier that uniquely identifies the organization to the server application; the second set of authentication tokens includes a tenant identifier that uniquely identifies the organization to the connected application; and the at least one processor is further configured to validate a mapping between the customer identifier and the tenant identifier; and the mapping is received from a configuration application.

In a fifteenth example implementation, a non-transitory computer readable medium storing processor executable instructions to authorize an application connector to access digital resources using multiple user identities. The instructions comprise instructions to receive, from a client application, a first set of authentication tokens that authorize a user of the client application to acquire target data provided by a server application. The instructions further comprise instructions to receive, from the client application, a second set of authentication tokens that authorize the same user to access a connected application. The instructions further comprise instructions to send, to the server application, a first request to acquire the target data provided by the server application, the first request including the first set of authentication tokens and an identifier of the target data. The instructions further comprise instructions to receive, from the server application, the target data. The instructions further comprise instructions to send the target data to the connected application in a second request that also includes the second set of authentication tokens.

In a sixteenth example implementation the user is a member of an organization; the first set of authentication tokens includes a customer identifier that uniquely identifies the organization to the server application; and the second set of authentication tokens includes a tenant identifier that uniquely identifies the organization to the connected application.

In a seventeenth example implementation the first and second sets of authentication tokens are received in a single communication sent from the client application.

In an eighteenth example implementation the first and second sets of authentication tokens, as well as the identifier of the target data, are received in a single communication sent from the client application.

In a nineteenth example implementation the instructions further comprise instructions to, before receiving the first and second sets of authentication tokens: receive, from the client application, an HTTP GET request for a URI path that includes (a) a domain associated with the server application and (b) a ticket that is correlated to a customer identifier that uniquely identifies an organization to the server application, wherein the user is a member of the organization; generate a modified URI path that (a) includes a new domain associated with the organization and (b) excludes the ticket; and send, to the client application, a redirect to the modified URI path.

In a twentieth example implementation the first set of authentication tokens is issued by a first identity provider that the server application recognizes as having authority to authenticate the user; and the second set of authentication tokens is issued by a second identity provider that the connected application recognizes as having authority to authenticate the user.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, each identical or nearly identical component that is illustrated is represented by a like reference numeral. For purposes of clarity, every component may not be labeled in every figure.

FIG. 2 is a flowchart illustrating an example method for acquiring and using multiple user identities to integrate functionality provided by multiple digital services.

FIGS. 3A through 3F comprise a sequence diagram schematically illustrating selected communication sequences that occur in an example technique for acquiring and using multiple user identities to integrate functionality provided by multiple digital services. The communication sequences illustrated in FIGS. 3A through 3F involve transmitting a customer identifier between a login interface and a third-party identity provider.

FIGS. 4A through 4C comprise a sequence diagram schematically illustrating selected communication sequences that occur in an example technique for acquiring multiple user identities to integrate functionality provided by multiple digital services. In the communication sequences illustrated in FIGS. 4A through 4C, a one-time-use ticket serves as a proxy for the customer identifier.

For purposes of clarity in the figures, the abbreviation "3PY" is used as a shorthand for "third-party"; the abbreviation "WSP" is used as a shorthand for "workspace"; and the abbreviation "ATs" is used as a shorthand for "authentication tokens".

DETAILED DESCRIPTION

As noted above, applications, services, and other digital resource providers often outsource their user authentication requirements to a trusted identity provider. A wide range of identity providers have been developed, each incorporating different operating parameters, different policies that dictate how users should be authenticated, and different criteria for managing identity information and granting authentication tokens. As a user accesses different resources, he/she may need to be authenticated by corresponding different identity providers, each issuing unique authentication tokens to the user. This will occur where, for example, a resource management system that uses a first identity provider is integrated with a connected application that uses a second identity provider. Disclosed herein are techniques that streamline the process of acquiring authentication tokens from multiple identity providers. This allows a user to send a single request that includes multiple authentication tokens for the corresponding multiple resources that need to be accessed to respond to the user request. More broadly, this facilitates integration between services that require different authentication identities.

System Architecture

Figure 1:
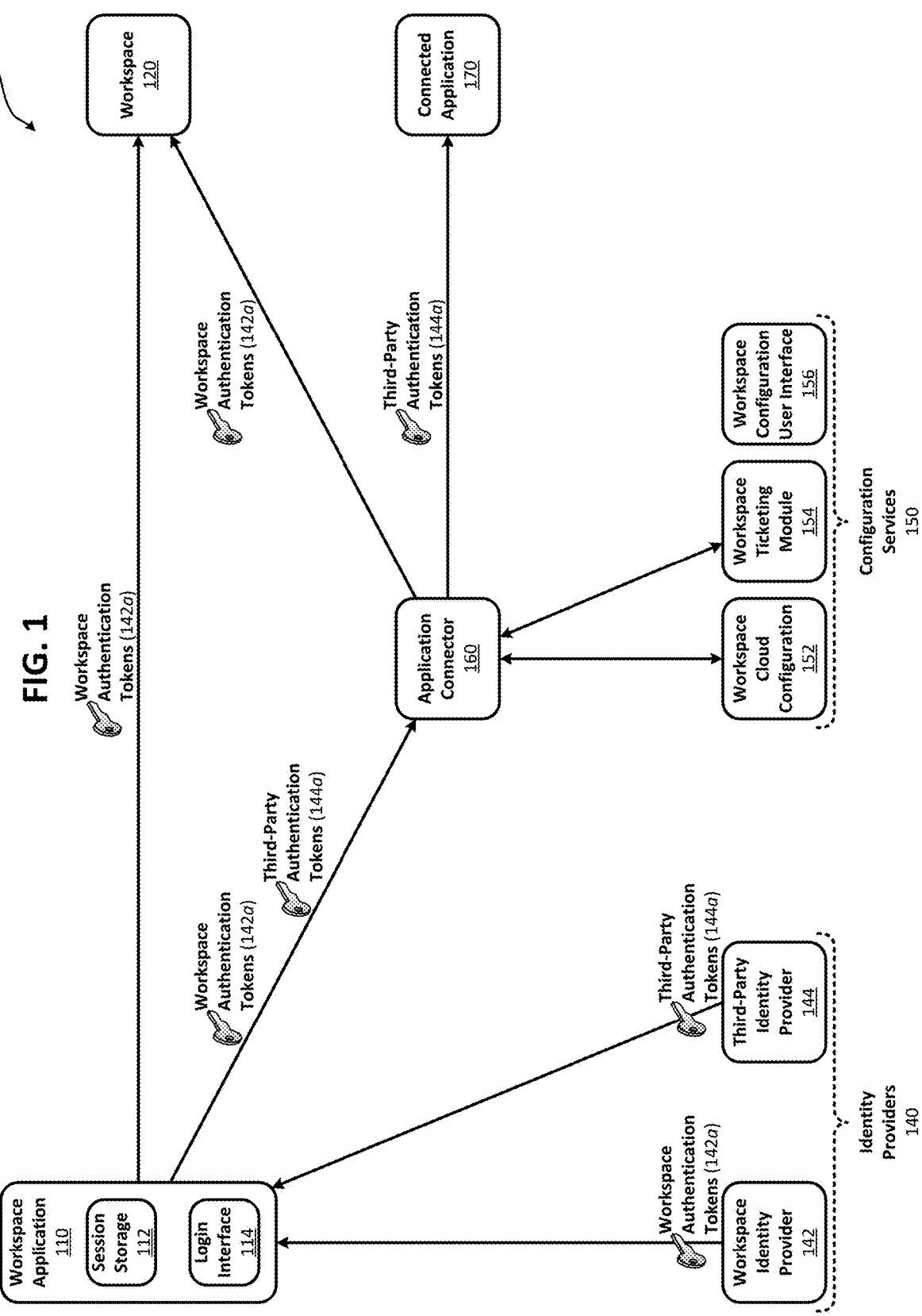
FIG. 1 is a block diagram schematically illustrating selected components of an example system for using multiple user identities to integrate functionality provided by multiple digital services.

FIG. 1 is a block diagram schematically illustrating selected components of an example system 1000 for using multiple user identities to integrate functionality provided by multiple digital services. System 1000 includes, among other things, a workspace application 110, a workspace 120, an application connector 160, and a connected application 170. A user uses workspace application 110 to access resources provided by workspace 120 and connected application 170, each of which may require the user to be authenticated by a different one of multiple identity providers 140. Application connector 160 manages and streamlines access to the target resources using authentication tokens provided by identity providers 140. For example, a workspace identity provider 142 generates workspace authentication tokens 142a that allow the user to access resources provided by workspace 120. Likewise, a third-party identity provider 144 generates third-party authentication tokens 144a that allow the user to access resources provided by connected application 170. FIG. 1 illustrates a single workspace application 110, workspace 120, application connector 160, and connected application 170 for the sake of clarity. Other implementations may include any suitable number of workspace applications 110, workspaces 120, and connected applications 170, as well as an appropriate number of corresponding application connectors 160 and identity providers 140.

In general, authentication tokens 142a, 144a authenticate the identity of the user of workspace application 110 and enable identification of resources that the authenticated user is authorized to access. In an example implementation, each set of authentication tokens includes a first token that identifies the user, and a second token that identifies the organization to which the user belongs. Because a set of authentication tokens is specific to a particular resource provider, two sets of authentication tokens that identify the same user (and same corresponding organization) may, in fact, constitute different tokens. As used herein, the terms "customer identifier", "organization identifier", and "workspace organization identifier" refer to an identifier of the organization to which a user belongs, as recognized by workspace 120. In contrast, as used herein, the term "tenant identifier" refers to an identifier of the organization to which a user belongs, as recognized by connected application 170. More generally, the term "tenant" refers to an organization that receives services provided by connected application 170, and to which a user of connected application 170 belongs. Thus workspace authentication tokens 142a will be understood as including a customer identifier (or organization identifier), while third-party authentication tokens 144a will be understood as including a tenant identifier.

In an example implementation workspace application 110 comprises a software application that provides content browsing capability. For example, in certain implementations workspace application 110 may be an HTML5 compliant browser; a software application that includes or otherwise initiates a hosted/embedded browser; or any other software application that is capable of acquiring and displaying digital resources as a result of processing a uniform resource identifier (URI). Workspace application 110 provides session storage 112 for temporary storage of, for example, authentication tokens used during a given browsing session in a given browser window or tab. Data stored in session storage 112 disappears when a browsing session ends, for example, as will occur when a browser window or tab is closed. Workspace application 110 is also capable of providing a login interface 114 through which an authentication workflow can be performed. Such an authentication workflow may involve two-way communications with one or more of identity providers 140, wherein such communications result in receipt of workspace authentication tokens 142a and/or third-party authentication tokens 144a upon successful authentication of the user. Workspace application 110 is executed on any suitable computing device, examples of which include desktop computers, laptop computers, tablet computers, and smartphones.

In an example implementation, workspace 120 is a digital resource management system such as Citrix Workspace™ (provided by Citrix Systems, Inc. (Fort Lauderdale, FL)). Workspace 120 is capable of providing a wide range of digital resources from networked locations, and may include systems or services for providing workspace application 110 with access to virtual applications, virtual desktops, file repositories, file sharing systems, secure browser services, and application management services. Workspace 120 may be located within an on-premises data center of an organization for which system 1000 is deployed, within a cloud computing environment, or elsewhere. Example cloud computing environments that may support implementation of workspace 120 include Microsoft Azure® Cloud (provided by Microsoft Corporation (Redmond, WA)), Amazon Web Services® (provided by Amazon.com, Inc. (Seattle, WA)), Google Cloud™ (provided by Google LLC (Mountain View, CA)), and IBM Cloud® (provided by International Business Machines Corporation (Armonk, NY)).

In some embodiments workspace application 110 and workspace 120 are implemented in a client-server relationship wherein digital resources are served from workspace 120 (server) to workspace application 110 (client). Thus workspace application 110 may also be referred to herein as a "client application" and workspace 120 may also be referred to herein as a "server application".

Connected application 170 refers generally to any application capable of integrating with, and connecting to, workspace 120, but that uses a different identity provider than that used by workspace 120. Connected applications may include, for example, software-as-a-service (SaaS) applications, web applications, desktop applications, and Linux® applications. In one example implementation, connected application 170 is a collaboration platform such as Microsoft Teams® (provided by Microsoft Corporation (Redmond, WA)), although other SaaS applications, such as other Office 365° applications (provided by Microsoft Corporation (Redmond, WA)), may be used in other implementations. Thus, using the example workspaces 120 and connected applications 170 disclosed herein, certain implementations would enable a Citrix Workspace™ user to send notifications to Microsoft Teams®, even though these two resources require the user to be authenticated by different identity providers. However, it should be appreciated that the workspaces and applications disclosed herein are provided by way of example only, and that, in general, workspace application 110 can be configured to access resources provided by any suitable workspace 120 and/or connected application 170.

As noted above, application connector 160 manages and streamlines access to resources provided by workspace 120 and connected application 170. Application connector 160 employs authentication tokens provided by appropriate identity providers 140 to authenticate the user of workspace application 110 and, following authentication, identify resources that the user is authorized to access. Application connector 160 can be understood as being a cloud-based software service that enables local processes, for instance using injected code that is specific to workspace 120. For example, in certain implementations the injected code enables the communication sequences illustrated in FIGS. 3A through 3F and FIGS. 4A through 4C, as will be described in greater detail below. This allows application connector 160 to become part of a virtualization infrastructure of workspace 120 that provides access to resources associated with connected application 170. Application connector 160 therefore has a degree of extensibility that allows it to be adapted for use with a wide range of connected applications 170.

In some implementations, application connector 160 uses one or more configuration services 150 to identify resources that a particular user is authorized to access and to verify that resources are allowed to be shared between particular services, such as between a particular workspace 120 and a particular connected application 170. For example, in one implementation configuration services 150 verify an established mapping between workspace authentication tokens 142a and third-party authentication tokens 144a. In some cases configuration services 150 include one or more of a workspace cloud configuration 152, a workspace ticketing module 154, and/or a workspace configuration user interface 156. The particular configuration services 150 illustrated in FIG. 1 will be described in greater detail in conjunction with the communication sequences illustrated in FIGS. 3A through 3F and FIGS. 4A through 4C. Configuration services 150 may be individually or collectively referred to herein as a "configuration application". In some implementations application connector 160 sends appropriate authentication tokens to a gateway service, while in other implementations application connector 160 sends the authentication tokens directly to a corresponding resource provider, such as workspace 120 and/or connected application 170.

FIG. 1 illustrates multiple identity providers 140, including for example workspace identity provider 142 that generates workspace authentication tokens 142a that allow the user to access resources provided by workspace 120; and third-party identity provider 144 that generates third-party authentication tokens 144a that allow the user to access resources provided by connected application 170. The different identity providers 140 may be deployed in different locations, for example on the premises of the organization for which identity services are provided. In some implementations one or more of identity providers 140 is a cloud-based service such as Azure® Active Directory®. In some cases an identity provider is capable of receiving and responding to a sign-on request transmitted from login interface 114 of workspace application 110.

Integration with Microapp Services

In some applications, workspace application 110 may present a user with a list of resources that are available via workspace 120 and/or one or more connected applications 170. Additionally or alternatively, workspace application 110 may provide a user with access to a streamlined feed of event notifications and/or available actions that may be taken with respect to detected events. Such an "activity feed", which may be user-customized, allows users to monitor important activity involving relevant resources, including resources available via workspace 120, resources available via one or more connected applications 170, virtual desktop resources, and networked storage resources. In some implementations, the activity feed allows a user to access resources through a single interface, referred to in some applications as a "notification card", without needing to switch context from one resource to another. Further, event notifications in the activity feed may be accompanied by a discrete set of user-interface elements, such as "approve", "deny", and "see more detail" buttons, that allow a user to take one or more simple actions with respect to a reported event. Enabling such actions to be taken from within a notification card interface allows a user to avoid context switching in many instances.

In some embodiments, an activity feed may be enabled by one or more micro-applications, also referred to as "microapps", that can interface with underlying associated resources using, for example, an application programming interface (API). The responsive actions may be user-initiated actions that are taken within a microapp and that provide inputs to the underlying applications through the API. The actions a user performs within a microapp may, for example, be designed to address specific common problems and use cases quickly and easily, adding to increased user productivity. Examples of such actions include responding to a vacation request, submitting a help desk ticket, approving an expense report, and responding to a new course registration announcement. Microapp notifications may be displayed via an interface provided by workspace application 110, thereby notifying a user of something that requires attention.

In this context, a microapp can be understood as a single use case made available to users to streamline functionality from complex enterprise applications. Microapps may, for example, use APIs available within SaaS, web, or proprietary applications, thereby allowing users to see content without needing a full launch of the application or needing to switch focus to the application. Absent such microapps, users would need to launch an application, navigate to the desired action, and invoke the action. Microapps may therefore streamline routine tasks for frequently performed actions and provide users the ability to perform actions from within workspace application 110 without having to launch or switch context to a separate native application. Microapps allow workspace application 110 to aggregate relevant notifications, tasks, and insights, thus providing the user with a dynamic productivity tool.

In some embodiments, workspace 120 includes a microapp service that can intelligently populate a user's resource activity feed by using machine learning and artificial intelligence algorithms. Further, in some implementations, microapps may be configured by an administrator of workspace 120, thus giving the administrator a powerful tool to create more productive workflows without requiring additional infrastructure. Whether pushed to a user or initiated by a user, microapps may provide shortcuts that simplify and streamline key tasks that would otherwise require launching or switching context to full enterprise applications. In some embodiments, out-of-the-box templates allow administrators with API account permissions to build microapp solutions targeted for their needs. Administrators may also, in some embodiments, be provided with tools to build custom microapps.

Figure 5:
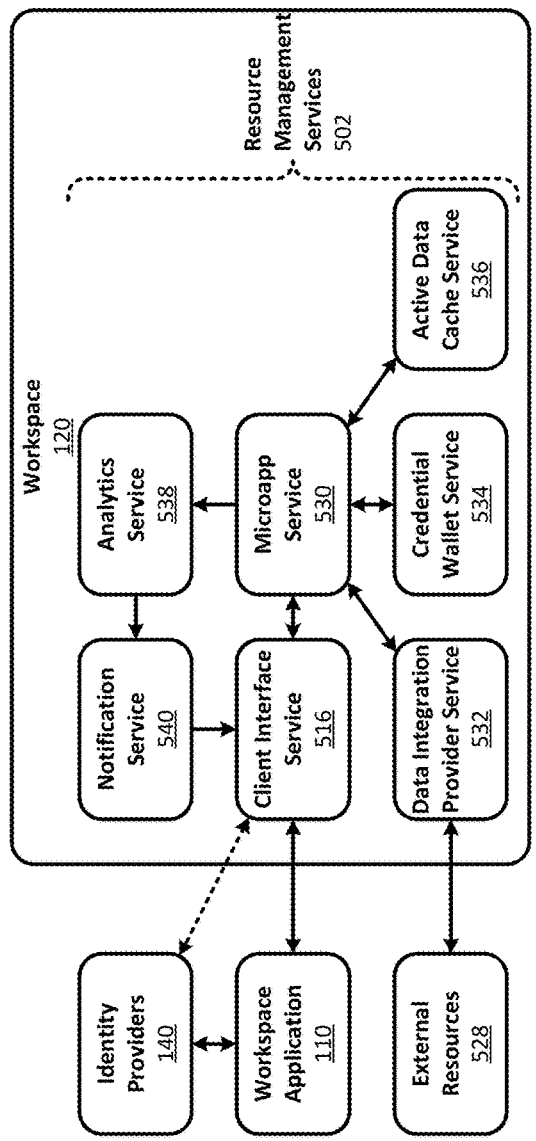
FIG. 5 is a block diagram schematically illustrating specific resource management services that, in certain implementations, may be incorporated into or otherwise provided by a workspace that forms part of the system of FIG. 1.

FIG. 5 is a block diagram schematically illustrating specific resource management services 502 that, in certain implementations, may be incorporated into or otherwise provided by workspace 120. One or more of resource management services 502 support the provision of a streamlined resource activity feed and/or notification process for a user of workspace application 110. Correspondingly, workspace application 110 can leverage one or more of resource management services 502 to provide a user with a personalized and integrated interface that enables seamless access to one or more external resources 528 that the user is authorized to access, including virtual workspaces, connected applications 170, and data storage resources. Example resource management services 502 include, but are not limited to, a client interface service 516, a microapp service 530, a data integration provider service 532, a credential wallet service 534, an active data cache service 536, an analytics service 538, and a notification service 540. Client interface service 516 is configured to send a sign-on request to one or more of identity providers 140, optionally via workspace application 110. Each of resource management services 502 may be located within an on-premises data center of an organization for which system 1000 is deployed, within one or more cloud computing environments, or elsewhere.

External resources 528 include applications and/or other resources that workspace 120 can leverage. Microapps can leverage external resources 528 via corresponding APIs. External resources 528 can be hosted on-premises or within a cloud computing environment. Connectors with out-of-the-box templates for frequently-used applications may be provided by default. Integration with other applications may additionally or alternatively be configured through a microapp page builder. A microapp page builder may, for example, connect to legacy, on-premises, and SaaS systems by creating streamlined user workflows via customized microapp actions. To implement such integrations, workspace 120, and in particular data integration provider service 532, may, for example, support representation state transfer APIs, JavaScript® Object Notation (JSON), Open Data Protocol JSON, and 6connect Markup Language (6ML™). Data integration provider service 532 may interact with external resources 528 to decrypt end user credentials. Data integration provider service 532 can also be configured to write back to external resources 528 under the identity of the user, for example using OAuth 2.0 or a suitable service account. The write-back actions may use the user's actual account to ensure that all actions performed are compliant with data policies of the interacting application or resource.

Still referring to the resource management services 502 illustrated in FIG. 5, microapp service 530 may be a single-tenant service responsible for creating, administering, and implementing microapps. Microapp service 530 may, for example, periodically pull active data from external resources 528 via data integration provider service 532 and send the resulting raw events to analytics service 538. Analytics service 538 processes the raw events to create targeted, scored notifications. Such notifications are sent to notification service 540, which is configured to process and store the notifications in a database from which they can be served in a notification feed at an appropriate time. In other implementations, notification service 540 may additionally or alternatively send the notifications to workspace application 110 immediately as a push notification that is provided via client interface service 516. Active data cache service 536 optionally provides a single-tenant service that stores configuration information and microapp data using, for example, a per-tenant database encryption key and per-tenant database credentials. Credential wallet service 534 stores encrypted service credentials and OAuth 2.0 authentication tokens for external resources 528. In an alternative implementation authentication tokens are stored in session storage 112 of workspace application 110. Details with respect to how authentication tokens can be acquired from multiple different identity providers will be disclosed in turn.

An example process for synchronizing workspace 120 with external resources 528, and for generating resulting notifications as appropriate, may operate as follows. Microapp service 530 retrieves encrypted service account credentials for external resources 528 from credential wallet service 534 and requests synchronization with data integration provider service 532. Data integration provider service 532 decrypts the service account credentials and uses those credentials to retrieve data from external resources 528. Data integration provider service 532 then streams the retrieved data to microapp service 530. Microapp service 530 stores the received data in active data cache service 536 and sends raw events to analytics service 538. Analytics service 538 creates targeted scored notifications and sends the notifications to notification service 540. Notification service 540 stores the notifications in a database to be served in a notification feed at an appropriate time. Alternatively, notification service 540 sends the notifications to workspace application 110 immediately as a push notification that is provided via client interface service 516. Upon receiving the notification, workspace application 110 can render the received information in an interactive notification card that includes graphical elements, textual content, and/or interactive user interface elements.

An example process for processing a user-initiated action via a microapp may operate as follows. A notification card is rendered at workspace application 110 that alerts of an outstanding action, such as a newly received vacation request, help desk ticket, expense report, or course registration announcement. The notification card may include user interface elements that allow the user to respond immediately, such as "approve", "deny", or "see more detail" buttons. When the user invokes an action from the notification card interface, workspace application 110 sends the user's requested action (for example, "approve expense report") to microapp service 530 via client interface service 516. Microapp service 530 then retrieves, from credential wallet service 534, an encrypted OAuth 2.0 token for one or more external resources that are required to complete the action. Microapp service 530 sends the action to data integration provider service 532 together with the encrypted OAuth 2.0 token. Data integration provider service 532 decrypts the OAuth 2.0 token and sends the action to the appropriate external resource under the user's identity. Data integration provider service 532 then reads back, from the external resource, response data that the external resource generates as a result of completing the requested action. Data integration provider service 532 sends the response data to microapp service 530, which in turn updates active data cache service 536 and causes a message to be sent to workspace application 110 via client interface service 516. The response data may, for example, notify the user with respect to whether the requested action was successfully completed and provide the user with any data generated as a result of completing (or attempting to complete) the action.

In some embodiments, in addition to or in lieu of the functionality described above, workspace 120 may provide users the ability to search for relevant information across files and applications, including in external resources 528. For example, a simple keyword search may be used to find application resources, SaaS applications, virtual desktops, files, and the like. This functionality may enhance user productivity and efficiency as application and data sprawl is prevalent across many organizations.

In some embodiments, in addition to or in lieu of the functionality described above, workspace 120 may support virtual assistance functionality that allows users to enhance productivity and take quick actions. Users may, for example, interact with a "Virtual Assistant" provided by workspace application 110 to ask questions such as "What is Bob Smith's phone number?" or "What absences are pending my approval?". Workspace application 110 may parse requests such as these and respond based on information provided via workspace 120 and/or external resources 528, such as Microsoft Teams®. This may help employees to work efficiently, stay organized, and deliver only the specific information that is sought in a given instance.

Methodology

As noted above, a wide range of identity providers have been developed, each incorporating different operating parameters, different policies that dictate how users should be authenticated, and different criteria for managing identity information and granting authentication tokens. Different resource providers may require authentication tokens issued by different identity providers. Thus, a user who wishes to access resources from different resource providers may need to authenticate himself/herself with different identity providers, each issuing unique authentication tokens to the user. Often a single task will require accessing resources from multiple identity providers, meaning that multiple sets of authentication tokens will be required to complete even a single task. Disclosed herein are methods that streamline the process of acquiring multiple sets of authentication tokens from multiple identity providers, and then using those multiple sets of authentication tokens to complete a task within the context of a digital workspace.

FIG. 2 is a flowchart illustrating an example method 2000 for acquiring and using multiple user identities to integrate functionality provided by multiple digital services. Method 2000, which can be invoked using the system illustrated in FIG. 1, provides a secure way to integrate services provided by workspace 120 and connected application 170, which in general, may require authentication by two different identity providers. Such integration allows a user to invoke compound operations that require the user to be successfully authenticated to both workspace 120 and connected application 170. In particular, such compound operations can be invoked using authentication tokens issued by respective APIs that are dependent on a particular identity provider.

Certain of the techniques disclosed herein also provide a method to enforce the use of related identities from different identity providers at a particular endpoint, such as at workspace application 110. In particular, the identity of the user can be enforced through a mapping of a customer identifier associated with workspace authentication tokens 142a to a tenant identifier associated with third-party authentication tokens 144a. Such mapping can be administered by configuration services 150 illustrated in FIG. 1. Such a mapping helps to enhance security by providing a way to (a) prevent an inconsistent pair of accounts from attempting to share resources, and (b) ensure that the accounts used to share resources also share the same user scope. For even further security, a mapping between customer and tenant identifiers can optionally be extended to include user account mapping, for example using a user's email address, principal name, object identifier, or any other suitable unique user identifier.

As disclosed previously, in one specific implementation the functionality associated with workspace 120 is provided by Citrix Workspace™ and the functionality associated with connected application 170 is provided by Microsoft Teams®. As part of the integration of these two services, Citrix Workspace™ enables users to send workspace notification cards to Microsoft Teams®. This "Send to Teams" operation, which could for example be invoked via a microapp notification card displayed at workspace application 110, requires the user to be authenticated by two different identity providers. In particular, Citrix Workspace™ requires the user to be authenticated by Citrix Gateway™ while Microsoft Teams® requires the user to be authenticated by Azure® Active Directory®. The techniques disclosed herein allow a user to acquire a first set of authentication tokens for Citrix Gateway™ (that is, workspace authentication tokens 142a) and a second set of authentication tokens for Microsoft Teams® (that is, third-party authentication tokens 144a), such that when the user invokes the aforementioned "Send to Teams" operation, both sets of authentication tokens can be included in the request. This effectively allows workspace application 110 to leverage multiple different identity providers. As noted above, configuration services 150 can be used to ensure that a user who authenticates with the multiple different identity providers is a member of a commonly-recognized organization, as defined by the mapping between the customer and tenant identifiers included in the authentication tokens. This helps to prevent an inconsistent pair of accounts from sharing resources.

Referring again to FIG. 2, method 2000 can be implemented, for example, using the system 1000 illustrated in FIG. 1 and described herein, and in particular, using functionality provided by workspace application 110 and application connector 160. However other system architectures and components can be used in other implementations. To this end, the correlation of the various functionalities shown in FIG. 2 to workspace application 110 or workspace connector 160 is not intended to imply any structural or use limitations. Rather, other implementations may include, for example, varying degrees of integration wherein certain functionalities are effectively performed by different components. For example, in an alternative implementation application connector 160 may be integrated into workspace 120, optionally using one or more resource management services 502 illustrated in FIG. 5. Thus other implementations may have fewer or more components depending on the granularity of a particular implementation. As can be seen, method 2000 includes a number of phases and sub-processes, the sequence of which may vary from one implementation to another. However, when considered in the aggregate, these phases and sub-processes are capable of acquiring and using multiple user identities to integrate functionality provided by multiple digital services.

Method 2000 can be understood as being initiated by a user who has already used workspace application 110 to authenticate himself/herself with workspace 120, meaning that the user already possesses workspace authentication tokens 142a issued by workspace identity provider 142. For example, where the functionality associated with workspace 120 is provided by Citrix Workspace™ and the user is authenticated by Citrix Gateway", then workspace authentication tokens 142a may comprise DS-Auth tokens stored in session storage 112 of workspace application 110. In other implementations OAuth 2.0 is used to authenticate the user with workspace 120. This prior authentication is represented in FIG. 1 by workspace authentication tokens 142a positioned on an arrow from workspace identity provider 142 to workspace application 110. Once workspace application 110 holds workspace authentication tokens 142a, the user can access resources provided by workspace 120, as represented in FIG. 1 by workspace authentication tokens 142a positioned on an arrow from workspace application 110 to workspace 120.

Thus, in one implementation method 2000 can be understood as beginning when a previously authenticated user invokes a command via workspace application 110, wherein the command represents a request to send data from workspace 120 to connected application 170. See reference numeral 210 in FIG. 2. One example of such a command is the "Send to Teams" operation described above. More specifically, a notification card generated by a microapp may present a user with new data (for example, new contact information), and may further include a "Send to Teams" button that allows the user to share the new data provided on the notification card with colleagues using Microsoft Teams®. While this particular example command involves data flowing in a particular direction (from workspace 120 to connected application 170), in general the command may represent any request that requires the user to be authenticated by multiple identity providers, regardless of the direction of data flow. Thus other implementations may involve data being sent from, for example, connected application 170 to workspace 120 and/or workspace application 110.

Upon receiving the command, workspace application 110 initiates authentication of the user with third-party identity provider 144, for example using OAuth 2.0. See reference numeral 220 in FIG. 2. OAuth 2.0, as described in Request for Comments (RFC) 6479 and RFC 8252, enables an application to obtain secure, limited access to a user's protected resources, such as a user's data, without requiring the user to provide a password to the application. In the context of the example "Send to Teams" operation described above, workspace application 110 may use login interface 114 to initiate an authentication session with Azure® Active Directory®, which is the identity provider used by Microsoft Teams®. This can be accomplished using an OAuth 2.0 implicit flow wherein the workspace application 110 receives an access token at the conclusion of a successful authentication session. These authentication tokens can be used to access the Microsoft Graph API using application connector 160, which in turn allows the user to access Microsoft Cloud service resources, including Microsoft Teams® services. This subsequent authentication is represented in FIG. 1 by third-party authentication tokens 144a positioned on an arrow from third-party identity provider 144 to workspace application 110.

Once the user has been successfully authenticated by third-party identity provider 144, application connector 160 acquires the identification and access tokens that form third-party authentication tokens 144a. See reference numeral 230 in FIG. 2. Application connector 160 then leverages configuration services 150 to verify a mapping between the previously acquired workspace authentication tokens 142a and the newly-acquired third-party authentication tokens 144a. See reference numeral 240 in FIG. 2. The verified mapping can be represented as follows:

workspace account↔workspace organization↔tenant↔tenant account

This mapping recognizes that workspace identity provider 142 and third-party identity provider 144 authenticate the same user, but nevertheless generate different tokens configured to be accepted by different entities (that is, workspace 120 and connected application 170). For example, each set of authentication tokens may include a token that identifies the organization to which the user belongs. But because a given set of authentication tokens is specific to a particular resource provider, two sets of authentication tokens that identify the same user (and same corresponding organization) may, in fact, constitute different tokens. For example, workspace authentication tokens 142a may include a customer identifier that identifies the organization to which the user belongs, as recognized by workspace 120. And third-party authentication tokens 144a may include a tenant identifier that identifies that same organization, as recognized by connected application 170. These different identifiers of the same organization are linked by the "workspace organization↔tenant" preconfigured relationship.

Once the mapping between the workspace organization and tenant have been verified, third-party authentication tokens 144a can be validated against this mapping. See reference numeral 245 in FIG. 2. Validating the tokens helps to enhance security by providing a way to (a) prevent an inconsistent pair of accounts from attempting to share resources, and (b) ensure that the accounts used to share resources also share the same user scope. For example, this validation operation helps to protect against token substitution by workspace application 110. For even further security, a mapping between customer and tenant identifiers can optionally be extended to include user account mapping, for example using a user's email address, principal name, object identifier, or any other suitable unique user identifier.

In certain embodiments workspace configuration user interface 156 (illustrated in FIG. 1) provides a tool that an administrator can use to configure application connector 160, and in particular, to define the "workspace organization↔tenant" mapping. This mapping is based on a recognition that two particular resource providers (for example, workspace 120 and connected application 170) may share resources to an authenticated user of a particular organization. This organizational-level mapping ensures that the authentications provided by workspace identity provider 142 and third-party identity provider 144 link two different resource providers. This is intended to prevent authentications issued to one organization from leaking information into a different organization.

Referring still to FIG. 2, after validating the mapping between the user's identity as authenticated by different identity providers, third-party authentication tokens 144a are returned to login interface 114 of workspace application 110. See reference numeral 250 in FIG. 2. This may include steps to ensure that third-party authentication tokens 144*a* are returned to the correct workspace domain to protect against the tokens falling into unauthorized hands, as will be discussed in greater detail below. Third-party authentication tokens 144*a* can be stored in session storage 112 of workspace application 110. When the user later generates a request that requires authenticated access to both workspace 120 and connected application 170, the workspace authentication tokens 142*a* and third-party authentication tokens 144*a* can be retrieved from session storage 112. Once the workspace application 110 has access to authentication tokens issued by multiple identity providers 140, the workspace application 110 can make various calls to application connector 160 that result in an API producing a URI that connected application 170 can recognize as indicating that the holder can access particular resources. As a security measure, data stored in session storage 112 disappears when a browsing session ends, for example, as will occur when a browser window or tab is closed. This helps to deter unauthorized use of authentication tokens stored at workspace application 110.

At some point workspace application 110 can be used to generate a request that requires authenticated access to both workspace 120 and connected application 170. Such request can be sent to application connector 160 along with workspace authentication tokens 142*a* and third-party authentication tokens 144*a*. See reference numeral 260 in FIG. 2. This request is represented in FIG. 1 by workspace authentication tokens 142*a* and third-party authentication tokens 144*a* positioned on an arrow from workspace application 110 to application connector 160. This request can be generated, for example, as a result of user interaction with a notification card generated by a microapp, such as when the user receives a notification card announcing new contact information for a key vendor and the user responds to such notification by selecting a "Send to Teams" button on the notification card. A wide range of other requests may likewise require authenticated access to both workspace 120 and connected application 170, and thus it should be appreciated that such request does not necessarily involve data flow in a particular direction or between particular applications.

Upon receiving the request, application connector 160 acquires the requested data from workspace 120 using workspace authentication tokens 142*a*. See reference numeral 270 in FIG. 2. This acquisition is represented in FIG. 1 by workspace authentication tokens 142*a* positioned on an arrow from workspace connector 160 to workspace 120. Workspace authentication tokens 142*a* optionally include additional data, referred to as "universal claims", that helps to identify the organization associated with the authenticated user. This enables application connector 160 to extract additional information regarding the notification card from which the user's request was generated. In certain embodiments this additional information is acquired from notification service 540 provided at workspace 120. After workspace 120 returns the requested data, application connector 160 sends the data to connected application 170 using third-party authentication tokens 144*a*. See reference numeral 280 in FIG. 2. Application connector 160 can accomplish this by generating a "card" based on the notification details obtained from workspace 120, and by further calling an API implemented with connected application 170 that causes the card to be shared to connected application 170. For example, where connected application 170 is Microsoft Teams®, application connector 160 calls the Microsoft Graph API to share the card to Microsoft Teams®. Third-party authentication tokens 144*a* are also passed to connected application 170 to establish the user's identity and authority. This data transmission is represented in FIG. 1 by third-party authentication tokens 144*a* positioned on an arrow from workspace connector 160 to connected application 170.

Data Flows—Using Customer Identifier

FIGS. 3A through 3F comprise a sequence diagram schematically illustrating selected communication sequences that occur in an example technique for acquiring and using multiple user identities to integrate functionality provided by multiple digital services. More specifically, the communication sequences illustrated in FIGS. 3A through 3F involve transmitting a customer identifier between login interface 114 and third-party identity provider 144. The communication sequences illustrated in FIGS. 3A through 3F can be used to implement the method 2000 illustrated in FIG. 2. As noted above, method 2000 can be understood as being initiated by a user who has already used workspace application 110 to authenticate himself/herself with workspace 120, meaning that the user already possesses workspace authentication tokens 142*a* issued by workspace identity provider 142. For example, where the functionality associated with workspace 120 is provided by Citrix Workspace™ and the user is authenticated by Citrix Gateway™, then workspace authentication tokens 142*a* may comprise DS-Auth tokens stored in session storage 112 of workspace application 110.

Given the foregoing, the communication sequences illustrated in FIGS. 3A through 3F can be understood as being triggered when an authenticated user of workspace 120 uses workspace application 110 to issue a command that requires the user to be authenticated by both workspace identity provider 142 and third-party identity provider 144. See reference numeral 301 in FIG. 3A. Such command may be referred to herein as the "trigger command". Fulfilling the trigger command involves accessing resources provided by both workspace 120 and connected application 170, each of which require the user to be authenticated by a different identity provider 140. One example of a trigger command is the aforementioned "Send to Teams" command that may be issued when a user of Citrix Workspace™ wishes to send information to collaborators using Microsoft Teams®. The user may issue the trigger command in response to workspace application 110 presenting the user with a notification card that was generated by a microapp. While this particular example trigger command involves data flowing in a particular direction (from workspace 120 to connected application 170), in general the trigger command may represent any request that requires the user to be authenticated by multiple identity providers 140, regardless of the direction of data flow.

Upon receipt of the trigger command, workspace application 110 attempts to acquire third-party authentication tokens 144*a* from session storage 112. See reference numeral 302 in FIG. 3A. Session storage 112 responds to such request by either returning the requested third-party authentication tokens 144*a*, or returning a message that such tokens do not exist, are expired, or are otherwise unavailable. See reference numeral 303 in FIG. 3A. Third-party authentication tokens 144*a* may already exist in session storage 112, for example because method 2000 was previously performed using the same browser tab or window of workspace application 110. In general, data stored in session storage 112 disappears when a browsing session ends, for example, as will occur when a browser window or tab is closed.

Upon receiving the response form session storage 112, workspace application 110 determines whether valid third-party authentication tokens 144a were received. See reference numeral 304 in FIG. 3A. For example, in certain implementations authentication tokens may be subject to expiration, and thus even if session storage 112 returns authentication tokens, such tokens would not be considered "valid" if they have previously expired. If valid third-party authentication tokens 144a are received, workspace application 110 can send such tokens to application connector 160 with the trigger command, as will be described in greater detail in turn (see reference numeral 329 in FIG. 3E).

However, if valid third-party authentication tokens 144a are not received, workspace application 110 can be configured to open login interface 114. See reference numeral 305 in FIG. 3A. This can be accomplished by, for example, opening a new browser tab. Once opened, login interface 114 initiates authentication of the user via third-party identity provider 144. See reference numeral 306 in FIG. 3A. This can be understood as sending a request for third-party authentication tokens 144a from login interface 114 to third-party identity provider 144. Upon receiving the request, third-party identity provider 144 authenticates the user via a suitable authentication protocol, one example of which is OAuth 2.0. See reference numeral 307 in FIG. 3A. Regardless of the particular protocol used, authentication of the user may require multiple back-and-forth communications between login interface 114 and third-party identity provider 144. These individual communications are not separately illustrated in FIG. 3A for clarity. Similarly, depending on the particular authentication protocol used and the configuration of third-party identity provider 144, multifactor authentication may be required, for example using an additional token sent to the user via a different communication channel, such as by text message, email, telephone call, or mobile application.

If the user fails to complete all authentication requirements imposed by the applicable authentication protocol, third-party identity provider 144 may return an authentication failure message to login interface 114. On the other hand, if the user is able to successfully complete all authentication requirements, third-party identity provider 144 establishes that the user is successfully authenticated. See reference numeral 308 in FIG. 3A. In this case, third-party identity provider 144 returns a redirect to login interface 114. See reference numeral 309 in FIG. 3B. A redirect is returned because third-party identity provider 144 expects to be communicating with a browser. An example of such a redirect is as follows:

> https://connector.example.com/handle3PYRedirect/
> #access_token=EFGH&client_info=XYZ
> &state=customerid This example redirect includes a common "base URI" ("http://connector.example.com/handle3PYRedirect/") and a "hash fragment" (the portion of the redirect following the base URI and beginning with the # symbol). The hash fragment comprises a plurality of name-value pairs. Specifically, the "access_token=EFGH" name-value pair form the third-party authentication tokens 144a establishes that the user has been authenticated by third-party identity provider 144. The "client_info=XYZ" name-value pair identifies the requesting browser that is authorized to access resources of connected application 170, that is, workspace application 110. The "state=customerid" name-value pair allows additional information to be passed under the OAuth 2.0 standard. In this example implementation, the user's customer identifier ("customerid") is provided in this field. The hash fragment may additionally or alternatively contain other name-value pairs such as an expiration timestamp or a token scope value. In such embodiments the hash fragment is not actually transmitted to workspace 120, but is instead retained at login interface 114, thus further enhancing security.

Applications that use OAuth 2.0 expect to receive redirect calls. However, to enhance security and limit scope, such applications typically only allow redirects from a relatively small preconfigured set of whitelisted URIs. For instance, the example redirect provided above includes the whitelisted base URI "connector.example.com/handle3PYRedirect". In general, it may be desired to use a different base URI in subsequent communications. Thus, upon receiving the redirect, login interface 114 responds by sending a first GET request to application connector 160. See reference numeral 310 in FIG. 3B. An example of such a first GET request is as follows:

GET https://connector.example.com/handle3PYRedirect

Thus, in certain embodiments the first GET request includes the base URI included in the redirect that was received from the third-party identity provider 144. This notifies application connector 160 that workspace application 110 has acquired authentication tokens from third-party identity provider 144, but that further processing is requested, as will be explained in turn. This first GET request, when processed by application connector 160, causes application connector 160 to return executable code to login interface 114. See reference numeral 311 in FIG. 3B. This executable code, which in certain implementations may comprise a JavaScript® element, is injected into login interface 114. When executed, it causes the "customerid" value to be extracted from the hash fragment included in the redirect that was received from third-party identity provider 144.

Login interface 114 executes the received code and extracts the "customerid" value from the hash fragment. See reference numeral 312 in FIG. 3B. Login interface 114 then sends a second GET request to application connector 160. See reference numeral 314 in FIG. 3B. An example of such a second GET request is as follows:

> https://connector.example.com/handle3PYRedirect/customerid
> #access_token=EFGH&client_info=XYZ
> &state=customerid As can be seen, this second GET request is similar to the redirect received from third-party identity provider 144, except that the "customerid" value has been appended to the base URI.

Upon receiving this second GET request, application connector 160 initiates a process for verifying a mapping between the previously acquired workspace authentication tokens 142a and third-party authentication tokens 144a. As explained above, this mapping can be represented as follows:

workspace account↔workspace organization↔tenant↔tenant account

This mapping recognizes that workspace identity provider 142 and third-party identity provider 144 authenticate the same user, but nevertheless generate different tokens configured to be accepted by different entities (that is, workspace 120 and connected application 170). Application connector 160 initiates this mapping verification subprocess by requesting, from workspace cloud configuration 152, the mapping between the workspace organization and the tenant (that is, "workspace organization↔tenant", as represented above). See reference numeral 315 in FIG. 3B. In certain implementations workspace cloud configuration 152 forms a part of workspace 120, and is defined when an organization is first onboarded as an organizational user of workspace 120. Workspace cloud configuration 152 can be understood as mapping to third-party identity provider 144. Thus, if a particular customer identifier is provided to workspace cloud configuration 152, the corresponding tenant can be identified.

Workspace cloud configuration 152 responds by sending the requested mapping to application connector 160. See reference numeral 316 in FIG. 3C. Workspace connector 160 makes a determination with respect to whether the received mapping is valid. See reference numeral 317 in FIG. 3C. Such validation can be based on validated mappings between workspace organizations and tenants, as saved at application connector 160. Such validated mapping can be defined, for example by an administrator using workspace configuration user interface 156. This organizational-level mapping ensures that the authentications provided by workspace identity provider 142 and third-party identity provider 144 also identify a specific subset of users at the organizational level. This is intended to prevent authentications issued to one organization from leaking information into a different organization. If application connector 160 cannot validate the mapping received from workspace cloud configuration 152, the process can be terminated and an error message can be returned to login interface 114.

As described above, the relationship between the previously acquired workspace authentication tokens 142a and third-party authentication tokens 144a can be verified using the mapping between the workspace organization and the tenant. However in alternative implementations additional or alternative identifiers could be used for the same purpose. For example, in an alternative implementation the tenant identifier is sent to application connector 160 to further strengthen the validation of the authentication scope. Likewise, in alternative implementations additional account mappings configured by an administrator of the workspace organization can be used to strengthen the validation as well.

If application connector 160 can validate the mapping, application connector 160 requests the organization domain name (for example, "CustomerName.example.com") from workspace cloud configuration 152. See reference numeral 318 in FIG. 3C. Workspace cloud configuration 152 returns the requested domain name to application connector 160. See reference numeral 319 in FIG. 3C. Upon receiving the domain name, application connector 160 uses the domain name to generate and send a redirect to login interface 114. See reference numeral 320 in FIG. 3C. An example of such a redirect is as follows:

https://CustomerName.example.com/Store/Web/
access_token=EFGH&client_info=XYZ&state=(customerid)

This redirect includes a hash fragment that, in turn, includes the validated third-party authentication tokens 144a (the "access token=EFGH" name-value pair). Login interface 114 recognizes this redirect by virtue of the matching hash fragment.

In response to receiving the redirect, login interface 114 uses the redirect to generate and send a third GET request to workspace 120. See reference numeral 321 in FIG. 3D. An example of such a third GET request is as follows:

https://CustomerName.example.com/Store/Web/
access_token=EFGH&client_info=XYZ&state=(customerid)

This third GET request, when processed by workspace 120, causes workspace 120 to return executable code to login interface 114. See reference numeral 322 in FIG. 3D. This executable code, which in certain implementations may comprise a JavaScript® element, is injected into login interface 114. When executed, it causes the third-party authentication tokens 144a to be extracted from the hash fragment included in the redirect that was received from application connector 160.

Login interface 114 executes the received code, parses the hash fragment, and extracts the third-party authentication tokens 144a. See reference numeral 323 in FIG. 3D. The extracted third-party authentication tokens 144a can then be stored in session storage 112. See reference numeral 324 in FIG. 3D. To successfully store third-party authentication tokens 144a in the correct session storage 112, the page domain of login interface 114 should be the same as the page domain of the browser window provided by workspace application 110. The organization domain name retrieved from workspace cloud configuration 152 provides this link. Once third-party authentication tokens 144a are stored in session storage 112, login interface 114 can be closed. See reference numeral 325 in FIG. 3E.

In certain implementations workspace application 110 is configured to detect that login interface 114 has been closed. See reference numeral 326 in FIG. 3E. In such implementations this triggers workspace application 110 to once again attempt to acquire third-party authentication tokens 144a from session storage 112. See reference numeral 327 in FIG. 3E. In this case, session storage 112 is able to return third-party authentication tokens 144a to workspace application 110. See reference numeral 328 in FIG. 3E. Workspace application 110 is now able to fulfill the user's original trigger command, that is, the command that requires the user to be authenticated by both workspace identity provider 142 and third-party identity provider 144. Workspace application 110 thus sends the trigger command to application connector 160 in a communication that includes both workspace authentication tokens 142a and third-party authentication tokens 144a. See reference numeral 329 in FIG. 3E. This request is represented in FIG. 1 by workspace authentication tokens 142a and third-party authentication tokens 144a positioned on an arrow from workspace application 110 to application connector 160.

Upon receiving the trigger command, application connector 160 can be configured to validate the received authentication tokens. See reference numeral 330 in FIG. 3E. In particular, because the request received from workspace application 110 includes authentication tokens for both workspace application 110 and connected application 170, application connector 160 is able to perform additional validation that normally would not be possible vis-à-vis a request including authentication tokens associated with a single entity. In particular, authentication tokens issued by different identity providers 140 can be validated not only on the basis of their inherent characteristics (for example, each individual token not expired), but also on the basis of their relationship between each other. This relationship can be validated regardless of the fact that the tokens were issued by different identity providers 140.

Application connector 160 can extract identifiers for the workspace organization and the tenant from the workspace authentication tokens 142a and the third-party authentication tokens 144a, respectively. In some implementations these identifiers are verified against a whitelisted mapping stored at application connector 160. Additionally or alternatively, application connector 160 can request a whitelisted mapping between workspace organization and tenant identifiers from workspace cloud configuration 152 (that is, "workspace organization↔tenant", as represented above). See reference numeral 331 in FIG. 3E. Workspace cloud configuration 152 responds by sending the requested mapping. See reference numeral 332 in FIG. 3F. This allows application connector 160 to validate the mapping. See reference numeral 333 in FIG. 3F. Regardless of how the authentication tokens are validated, such validation provides an additional layer of protection against malicious attacks, for example based on attempted spoofing of the authentication tokens. This additional layer of protection would not be possible in a framework relying on authentication tokens issued by a single identity provider.

Once the authentication tokens are validated against each other, application connector 160 requests target data from workspace 120 using workspace authentication tokens 142a. See reference numeral 334 in FIG. 3F. In this context, "target data" refers to a resource provided by workspace 120 that needs to be accessed to fulfill the user's original trigger command. Referring again to the aforementioned application wherein the user has executed a "Send to Teams" command, the target data would refer to the data that the user desires to send to Microsoft Teams®. This request sent to workspace 120 is represented in FIG. 1 by workspace authentication tokens 142a positioned on an arrow from workspace connector 160 to workspace 120. Upon receiving the request, workspace 120 validates the received workspace authentication tokens 142a and sends the requested data to application connector 160. See reference numeral 335 in FIG. 3F.

Application connector 160 can send the data received from workspace 120 to connected application 170 in a communication that includes third-party authentication tokens 144a. See reference numeral 336 in FIG. 3F. This data transmission is represented in FIG. 1 by third-party authentication tokens 144a positioned on an arrow from workspace connector 160 to connected application 170. Connected application 170 validates the received third-party authentication tokens 144a and processes the received data under the user's identity. Upon successfully validating the authentication tokens and processing the received data, connected application 170 can return an operation success notification to application connector 160. See reference numeral 337 in FIG. 3F. Application connector 160 can, in turn, return an operation success notification to workspace application 110. See reference numeral 338 in FIG. 3F. Workspace authentication tokens 142a and third-party authentication tokens 144a are optionally retained in session storage 112 in the event that the user invokes additional commands that require both sets of tokens. Data stored in session storage 112 will disappear when the user's browsing session ends, for example, as will occur when the browser window or tab is closed.

Data Flows—Hidden Customer Identifier

The communication sequence described above with respect to FIGS. 3A through 3F involves transmitting a customer identifier between login interface 114 and third-party identity provider 144. In some applications it may be desired to avoid transmitting the customer identifier in any communications that involve workspace application 110. This can be avoided through the use of a one-time-use ticket that is issued by configuration services 150, and in particular, workspace ticketing module 154. The one-time-use ticket can serve as a temporary proxy for the customer identifier, thus enhancing security. FIGS. 4A through 4C comprise a sequence diagram schematically illustrating selected communication sequences that occur in an example technique for acquiring multiple user identities to integrate functionality provided by multiple digital services, wherein a one-time-use ticket serves as a proxy for the customer identifier. In particular, certain portions of the communication sequence illustrated in FIGS. 3A through 3F can be replaced with the communication sequence illustrated in FIGS. 4A through 4C, as will be described in turn.

As described above with respect to FIG. 3A, when a user invokes a trigger command workspace application 110 attempts to acquire valid third-party authentication tokens 144a from session storage 112. When such an attempt fails, workspace application 110 is configured to open a login interface 114 which is, in turn, used to authenticate the user via third-party identity provider 144. This authentication procedure involves transmitting communications that include, embedded in a URI, a customer identifier associated with the user. As noted above, in some applications this may be undesirable from a security standpoint. Thus, in an alternative implementation, once workspace application 110 fails to acquire valid third-party authentication tokens 144a from session storage 122, the alternative sequence of communications illustrated in FIGS. 4A through 4C is initiated. This initial branching to an alternative procedure occurs after reference numeral 304 in FIG. 3A.

Turning now FIG. 4A, once workspace application 110 fails to acquire valid third-party authentication tokens 144a from session storage 122, workspace application 110 requests an authentication context from application connector 160. See reference numeral 401 in FIG. 4A. Application connector 160 forwards this request to workspace cloud configuration 152. See reference numeral 402 in FIG. 4A. In this context, the requested "authentication context" defines the user's identity based on the user's prior authentication by workspace identity provider 142. Given the workspace organization identifier associated with the requesting user, workspace cloud configuration 152 is able to determine the associated tenant identifier. More specifically, this tenant identifier is determined based on the whitelisted "workspace organization↔tenant" mapping, as discussed above. Workspace cloud configuration then returns the tenant identifier to application connector 160. See reference numeral 403 in FIG. 4A.

Application connector 160 can then use workspace organization identifier and tenant identifier to request a one-time-use ticket from workspace ticketing module 154. See reference number 404 in FIG. 4A. Workspace ticketing module 154 generates the one-time-use ticket. See reference numeral 405 in FIG. 4A. This one-time-use ticket can be associated with the whitelisted "workspace organization↔tenant" mapping that forms the basis for the request received from application connector 160. Workspace ticketing module 154 then returns the one-time-use ticket to application connector 160. See reference numeral 406 in FIG. 4A. Application connector 160 can then return the one-time-use ticket, the workspace organization identifier, and the tenant identifier to workspace application 110. See reference numeral 407 in FIG. 4A. Collectively, this communication can be understood as comprising the aforementioned authentication context since it provides the context within which the user will be authenticated, wherein the context is defined by the different organizations (workspace 120, connected application 170) within which the user is authorized to access resources.

Upon receiving the authentication context, workspace application 110 can set a "domain hint" using the tenant identifier. See reference numeral 408 in FIG. 4A. For example, a variable domain hint can be used to set a ticket identifier value. Workspace application 110 then opens login interface 114. See reference numeral 409 in FIG. 4B. This can be accomplished by, for example, opening a new browser tab. Once opened, login interface 114 initiates authentication of the user via third-party identity provider 144. To support such authentication, login interface 114 sends data to support authentication with third-party identity provider 144, thus streamlining the authentication process from the user's perspective. Where third-party identity provider 144 uses OAuth 2.0, this supporting information can include an identifier of the workspace organization, a redirect URI, and/or a copy of the one-time-use ticket acquired from workspace ticketing module 154. See reference numeral 410 in FIG. 3B. An example of a request sent from login interface 114 to third-party identity provider 144 is as follows:

```
/oauth2/v2.0/authorize?response_type=id_token&scope=scopes
&client_id=client_id&redirect_uri=
https://connector.example.com/handle3PYRedirect/
&prompt=select_account&response_mode=fragment&state=ticket
```

Third-party identity provider 144 can use this information to authorize the user via, for example, OAuth 2.0. See reference numeral 411 in FIG. 4B. Regardless of the particular protocol used, authentication of the user may require multiple back-and-forth communications between login interface 114 and third-party identity provider 144. These individual communications are not separately illustrated in FIG. 4A for clarity. Similarly, depending on the particular authentication protocol used and the configuration of third-party identity provider 144, multifactor authentication may be required, for example using an additional token sent to the user via a different communication channel, such as by text message, email, telephone call, or mobile application. If the user fails to complete all authentication requirements imposed by the applicable authentication protocol, third-party identity provider 144 may return an authentication failure message to login interface 114. On the other hand, if the user is able to successfully complete all authentication requirements, third-party identity provider 144 establishes that the user is successfully authenticated. See reference numeral 412 in FIG. 4B.

In response to successfully authenticating the user, third-party identity provider 144 returns a redirect to login interface 114. See reference numeral 414 in FIG. 4B. A redirect is returned because third-party identity provider 144 expects to be communicating with a browser. An example of such a redirect is as follows:

```
https://connector.example.com/handle3PYRedirect/
#access_token=EFGH&client_info=XYZ&state=ticket
```

This example redirect includes a common "base URI" ("http://connector.example.com/handle3PYRedirect/") and a "hash fragment" (the portion of the redirect following the base URI and beginning with the # symbol). The hash fragment comprises a plurality of name-value pairs. Specifically, the "access_token=EFGH" name-value pair form the third-party authentication tokens 144a establishes that the user has been authenticated by third-party identity provider 144. The "client_info=XYZ" name-value pair identifies the requesting browser that is authorized to access resources of connected application 170, that is, workspace application 110. The "state=ticket" name-value pair represents the one-time-use ticket acquired from workspace ticketing module 154. The hash fragment may additionally or alternatively contain other name-value pairs such as an expiration timestamp or a token scope value.

Applications that use OAuth 2.0 expect to receive redirect calls. However, to enhance security and limit scope, such applications typically only allow redirects from a relatively small preconfigured set of whitelisted URIs. For instance, the example redirect provided above includes the whitelisted base URI "connector.example.com/handle3PYRedirect". In general, it may be desired to use a different base URI in subsequent communications. Thus, upon receiving the redirect, login interface 114 responds by sending a first GET request to application connector 160. See reference numeral 415 in FIG. 4B. An example of such a first GET request is as follows:

GET https://connector.example.com/handle3PYRedirect

Thus, in certain embodiments the first GET request includes the base URI included in the redirect that was received from the third-party identity provider 144. This notifies application connector 160 that workspace application 110 has acquired authentication tokens from third-party identity provider 144, but that further processing is requested, as will be explained in turn. This first GET request, when processed by application connector 160, causes application connector 160 to return executable code to login interface 114. See reference numeral 416 in FIG. 4B. This executable code, which in certain implementations may comprise a JavaScript® element, is injected into login interface 114. When executed, it causes the one-time-use ticket to be extracted from the hash fragment included in the redirect that was received from third-party identity provider 144.

Login interface 114 executes the received code and extracts the one-time-use ticket from the hash fragment. See reference numeral 417 in FIG. 4C. Login interface 114 then sends a second GET request to application connector 160. See reference numeral 418 in FIG. 4C. An example of such a second GET request is as follows:

```
https://connector.example.com/handle3PYRedirect/?ticket
#access_token=EFGH&client_info=XYZ
```

As can be seen, this second GET request is similar to the redirect received from third-party identity provider 144, except that the one-time-use ticket has been appended to the base URI.

Upon receiving this second GET request, application connector 160 sends a request to workspace ticketing module 154 to redeem the one-time-use ticket included in the second GET request. See reference numeral 419 in FIG. 4C. As noted above, workspace ticketing module 154 associates the one-time-use ticket with the whitelisted "workspace organization 4→tenant" mapping. Workspace ticketing module 154 uses the one-time-use ticket to look up the workspace organization identifier and tenant identifier, which are then returned to application connector 160. See reference numeral 420 in FIG. 4C.

Application connector 160 requests the organization domain name (for example, "CustomerName.example.com") from workspace cloud configuration 152. See reference numeral 421 in FIG. 4C. Workspace cloud configuration 152 returns the requested domain name to application connector 160. See reference numeral 422 in FIG. 4C. Upon receiving the domain name, application connector 160 uses the domain name to generate and send a redirect to login interface 114. See reference numeral 423 in FIG. 4C. An example of such a redirect is as follows:

---
https://CustomerName.example.com/Store/Web/
access_token=EFGH&client_info=XYZ
---

This redirect includes a hash fragment that, in turn, includes the validated third-party authentication tokens 144a (the "access token=EFGH" name-value pair). Login interface 114 recognizes this redirect by virtue of the matching hash fragment. In response to receiving the redirect, login interface 114 uses the redirect to generate and send a third GET request to workspace 120. See reference numeral 424 in FIG. 4C. An example of such a third GET request is as follows:

---
https://CustomerName.example.com/Store/Web/
access_token=EFGH&client_info=XYZ
---

This third GET request, when processed by workspace 120, causes workspace 120 to return executable code to login interface 114. See reference numeral 322 in FIG. 3D. At this point the sequence of communications illustrated in FIGS. 3D through 3F can be followed since such communications do not require the customer identifier to be transmitted in communications involving workspace application 110. In particular, because the one-time-use ticket serves as a temporary proxy for the customer identifier, security is enhanced because the customer identifier is not transmitted in communications that involve workspace application 110.

Computing Devices for Application Connector

Figure 6:
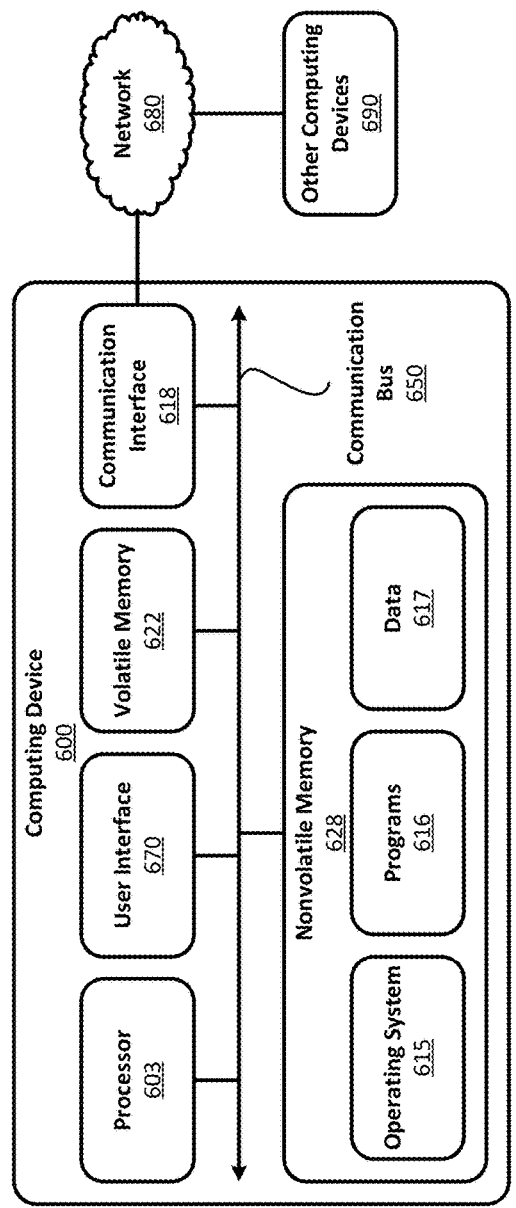
FIG. 6 is a block diagram schematically illustrating an example computing device configured to implement various components of the systems disclosed herein.

FIG. 6 is a block diagram schematically illustrating an example computing device 600 configured to implement various components of the systems disclosed herein. Computing device 600 includes a processor 603, volatile memory 622 (for example, random access memory (RAM)), nonvolatile memory 628 (also referred to as non-transitory memory), a user interface 670, a network or communication interface 618, and a communication bus 650. Computing device 600 may also be referred to as a client device, endpoint device, computer, or computer system. Computing device 600 may be used to implement, for example, workspace application 110, workspace 120, application connector 160, and/or connected application 170. In particular, computing device 600 is shown merely as an example client device or server and can be implemented within any suitable computing or processing environment with any suitable type of physical or virtual machine or set of physical and virtual machines that can have suitable hardware and/or software capable of operating as described herein.

Nonvolatile memory 628 can include one or more hard disk drives or other magnetic or optical storage media. Nonvolatile memory 628 can additionally or alternatively include one or more solid state drives, such as a flash drive or other solid-state storage media. Nonvolatile memory 628 can additionally or alternatively include one or more hybrid magnetic and solid-state drives. Nonvolatile memory 628 can additionally or alternatively include one or more virtual storage volumes, such as a cloud storage, or a combination of such physical storage volumes and virtual storage volumes or arrays thereof.

User interface 670 can include a graphical user interface, examples of which include controls presented on a touchscreen, a display, or the like. User interface 670 can additionally or alternatively include one or more input/output devices, examples of which include a mouse, a keyboard, a microphone, one or more speakers, one or more cameras, one or more biometric scanners, one or more environmental sensors, one or more accelerometers, one or more visors, and the like.

Nonvolatile memory 628 stores an operating system 615, one or more applications or programs 616, and data 617. Operating system 615 and programs 616 include sequences of instructions that are encoded for execution by processor 603. Execution of these instructions results in manipulated data. Prior to their execution, the instructions can be copied to volatile memory 622. In some examples, volatile memory 622 can include one or more types of RAM and/or a cache memory that can offer a faster response time than a main memory. Data 617 can be entered through user interface 670 or received from the input/output devices such as communication interface 618. The various elements of computing device 600 described above can communicate with one another via communication bus 650.

Processor 603 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. Processor 603 can perform the function, operation, or sequence of operations using digital values and/or using analog signals. In some examples, processor 603 can be embodied in one or more application specific integrated circuits, microprocessors, digital signal processors, graphics processing units, microcontrollers, field programmable gate arrays, programmable logic arrays, multicore processors, or general-purpose computers with associated memory. Processor 603 can be analog, digital, or mixed. In some examples, processor 603 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

Communication interface 618 can include one or more interfaces to enable computing device 600 to access a computer network 680 such as a local area network, a wide area network, a personal area network, or the Internet through a variety of wired and/or wireless connections, including cellular connections and Bluetooth connections. In some examples, network 680 may allow for communication with other computing devices 690 to enable distributed computing. Examples of other computing devices 690 include workspace application 110, workspace 120, application connector 160, and connected application 170. Network 680 can include, for example, one or more private and/or public networks over which computing devices can exchange data.

In described examples, computing device 600 can execute an application on behalf of a user of a client device. For example, computing device 600 can execute one or more virtual machines managed by a hypervisor. Each virtual machine can provide an execution session within which applications execute on behalf of a user or a client device, such as a hosted desktop session. Computing device 600 can also execute a terminal services session to provide a hosted desktop environment. Computing device 600 can provide access to a remote computing environment including one or more applications, one or more desktop applications, and one or more desktop sessions in which one or more applications can execute.

Conclusion

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims. In addition, the phraseology and terminology used herein is for the purpose of description and should not be regarded as limiting. Any references to examples, components, elements, or acts of the systems and methods herein referred to in the singular can also embrace examples including a plurality. Likewise, any references in plural to any example, component, element, or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

What is claimed is:

1. A method of providing access to digital resources using multiple user identities, the method comprising:

receiving, by an application connector, from a client application, a first set of authentication tokens that authorize a user of the client application to acquire target data provided by a server application, wherein the first set of authentication tokens uniquely identifies a first organization to which the user belongs;

receiving, by the application connector, from the client application, a second set of authentication tokens that authorize the user to access a connected application, wherein the second set of authentication tokens uniquely identifies a second organization to which the user belongs;

validating that the identified first and second organizations are a same organization;

sending, from the application connector, to the server application, a first request to acquire the target data provided by the server application, the first request including the first set of authentication tokens and an identifier of the target data;

receiving, by the application connector, from the server application, the target data; and sending the target data from the application connector to the connected application in a second request that also includes the second set of authentication tokens;

wherein:

the first set of authentication tokens includes a customer identifier that uniquely identifies the first organization to the server application;

the second set of authentication tokens includes a tenant identifier that uniquely identifies the second organization to the connected application;

validating that the identified first and second organizations are the same organization further comprises validating a mapping between the customer identifier and the tenant identifier; and the application connector receives the mapping from a configuration application.

2. The method of claim 1, wherein:

the first set of authentication tokens includes a customer identifier that uniquely identifies the first organization to the server application; and the second set of authentication tokens includes a tenant identifier that uniquely identifies the second organization to the connected application.

3. The method of claim 1, wherein the first and second sets of authentication tokens are received in a single communication sent from the client application to the application connector.

4. The method of claim 1, wherein the first and second sets of authentication tokens, as well as the identifier of the target data, are received in a single communication sent from the client application to the application connector.

5. The method of claim 1, further comprising, before the application connector receives the first and second sets of authentication tokens:

receiving, by the application connector, from the client application, an HTTP GET request for a URI path that includes (a) a domain associated with the server application and (b) a ticket that is correlated to a customer identifier that uniquely identifies the first organization to the server application;

generating a modified URI path that (a) includes a new domain associated with the first organization and (b) excludes the ticket; and sending, from the application connector, to the client application, a redirect to the modified URI path.

6. The method of claim 1, wherein:

the first set of authentication tokens is issued by a first identity provider that the server application recognizes as having authority to authenticate the user; and the second set of authentication tokens is issued by a second identity provider that the connected application recognizes as having authority to authenticate the user.

7. A computer system comprising:

a memory;

a network interface; and at least one processor coupled to the memory and the network interface and configured to:

receive, from a client application, a first set of authentication tokens that authorize a user of the client application to acquire target data provided by a server application, wherein the first set of authentication tokens uniquely identifies a first organization to which the user belongs;

receive, from the client application, a second set of authentication tokens that authorize the user to access a connected application, wherein the second set of authentication tokens uniquely identifies a second organization to which the user belongs;

validate that the identified first and second organizations are a same organization;

send, to the server application, a first request to acquire the target data provided by the server application, the first request including the first set of authentication tokens and an identifier of the target data;

receive, from the server application, the target data; and
send the target data to the connected application in a second request that also includes the second set of authentication tokens;

wherein the at least one processor is further configured to, before receiving the first and second sets of authentication tokens:
   receive, from the client application, an HTTP GET request for a URI path that includes (a) a domain associated with the server application and (b) a ticket that is correlated to a customer identifier that uniquely identifies the first organization to the server application;
   generate a modified URI path that (a) includes a new domain associated with the first organization and (b) excludes the ticket; and
   send, to the client application, a redirect to the modified URI path.

8. The computer system of claim 7, wherein:
the first set of authentication tokens includes a customer identifier that uniquely identifies the first organization to the server application; and
the second set of authentication tokens includes a tenant identifier that uniquely identifies the second organization to the connected application.

9. The computer system of claim 7, wherein the first and second sets of authentication tokens are received in a single communication sent from the client application.

10. The computer system of claim 7, wherein the first and second sets of authentication tokens, as well as the identifier of the target data, are received in a single communication sent from the client application.

11. The computer system of claim 7, wherein:
the first set of authentication tokens is issued by a first identity provider that the server application recognizes as having authority to authenticate the user; and
the second set of authentication tokens is issued by a second identity provider that the connected application recognizes as having authority to authenticate the user.

12. The computer system of claim 7, wherein:
the first set of authentication tokens includes a customer identifier that uniquely identifies the first organization to the server application;
the second set of authentication tokens includes a tenant identifier that uniquely identifies the second organization to the connected application; and
validating that the identified first and second organizations are the same organization further comprises validating a mapping between the customer identifier and the tenant identifier; and
the mapping is received from a configuration application.

13. The computer system of claim 7, wherein:
the first and second sets of authentication tokens are received from the client application via the network interface;
the first request is sent to the server application via the network interface; and
the target data is sent to the connected application via the network interface.

14. A non-transitory computer readable medium storing processor executable instructions to authorize an application connector to access digital resources using multiple user identities, the instructions comprising instructions to:
receive, from a client application, an HTTP GET request for a URI path that includes (a) a domain associated with a server application and (b) a ticket that is correlated to a customer identifier that uniquely identifies an organization to the server application;
generate a modified URI path that (a) includes a new domain associated with the organization and (b) excludes the ticket;
send, to the client application, a redirect to the modified URI path;
receive, from the client application, a first set of authentication tokens that authorize a user of the client application to acquire target data provided by the server application, wherein the user is a member of the organization;
receive, from the client application, a second set of authentication tokens that authorize the user to access a connected application;
send, to the server application, a first request to acquire the target data provided by the server application, the first request including the first set of authentication tokens and an identifier of the target data;
receive, from the server application, the target data; and
send the target data to the connected application in a second request that also includes the second set of authentication tokens.

15. The non-transitory computer readable medium of claim 14, wherein:
the first set of authentication tokens includes the customer identifier that uniquely identifies the organization to the server application; and
the second set of authentication tokens includes a tenant identifier that uniquely identifies the organization to the connected application.

16. The non-transitory computer readable medium of claim 14, wherein the first and second sets of authentication tokens are received in a single communication sent from the client application.

17. The non-transitory computer readable medium of claim 14, wherein the first and second sets of authentication tokens, as well as the identifier of the target data, are received in a single communication sent from the client application.

18. The non-transitory computer readable medium of claim 14, wherein:
the first set of authentication tokens is issued by a first identity provider that the server application recognizes as having authority to authenticate the user; and
the second set of authentication tokens is issued by a second identity provider that the connected application recognizes as having authority to authenticate the user.

19. A method of providing access to digital resources using multiple user identities, the method comprising:
receiving, by an application connector, from a client application, a first set of authentication tokens that authorize a user of the client application to acquire target data provided by a server application, wherein the first set of authentication tokens uniquely identifies a first organization to which the user belongs;
receiving, by the application connector, from the client application, a second set of authentication tokens that authorize the user to access a connected application, wherein the second set of authentication tokens uniquely identifies a second organization to which the user belongs;
validating that the identified first and second organizations are a same organization;
sending, from the application connector, to the server application, a first request to acquire the target data provided by the server application, the first request including the first set of authentication tokens and an identifier of the target data;
receiving, by the application connector, from the server application, the target data;
sending the target data from the application connector to the connected application in a second request that also includes the second set of authentication tokens; and
before the application connector receives the first and second sets of authentication tokens:
    receiving, by the application connector, from the client application, an HTTP GET request for a URI path that includes (a) a domain associated with the server application and (b) a ticket that is correlated to a customer identifier that uniquely identifies the first organization to the server application;
    generating a modified URI path that (a) includes a new domain associated with the first organization and (b) excludes the ticket; and
    sending, from the application connector, to the client application, a redirect to the modified URI path.

20. A computer system comprising:
a memory;
a network interface; and
at least one processor coupled to the memory and the network interface and configured to:
receive, from a client application, a first set of authentication tokens that authorize a user of the client application to acquire target data provided by a server application, wherein the first set of authentication tokens uniquely identifies a first organization to which the user belongs;
receive, from the client application, a second set of authentication tokens that authorize the user to access a connected application, wherein the second set of authentication tokens uniquely identifies a second organization to which the user belongs;
validate that the identified first and second organizations are a same organization;
send, to the server application, a first request to acquire the target data provided by the server application, the first request including the first set of authentication tokens and an identifier of the target data;
receive, from the server application, the target data;
send the target data to the connected application in a second request that also includes the second set of authentication tokens;
wherein:
    the first set of authentication tokens includes a customer identifier that uniquely identifies the first organization to the server application;
    the second set of authentication tokens includes a tenant identifier that uniquely identifies the second organization to the connected application; and
    validating that the identified first and second organizations are the same organization further comprises validating a mapping between the customer identifier and the tenant identifier; and
    the mapping is received from a configuration application.

\* \* \* \* \*